US012606647B2

(12) United States Patent
Fontaine et al.

(10) Patent No.: US 12,606,647 B2
(45) Date of Patent: Apr. 21, 2026

(54) HYDROCARBYL-MODIFIED METHYLALUMINOXANE COCATALYSTS FOR BIS-PHENYLPHENOXY METAL-LIGAND COMPLEXES

(71) Applicant: Dow Global Technologies LLC, Midland, MI (US)

(72) Inventors: Philip P. Fontaine, Lake Jackson, TX (US); David M. Pearson, Lake Jackson, TX (US); Hien Q. Do, Lake Jackson, TX (US); Johnathan E. Delorbe, Lake Jackson, TX (US); Rafael Huacuja, Lake Jackson, TX (US); Rhett A. Baillie, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 470 days.

(21) Appl. No.: 18/005,754

(22) PCT Filed: Feb. 5, 2021

(86) PCT No.: PCT/US2021/016814
§ 371 (c)(1),
(2) Date: Jan. 17, 2023

(87) PCT Pub. No.: WO2022/015369
PCT Pub. Date: Jan. 20, 2022

(65) Prior Publication Data

US 2023/0287152 A1 Sep. 14, 2023

Related U.S. Application Data

(60) Provisional application No. 63/053,350, filed on Jul. 17, 2020.

(51) Int. Cl.

| | |
|---|---|
| ***C08F 4/76*** | (2006.01) |
| ***C08F 2/44*** | (2006.01) |
| ***C08F 4/52*** | (2006.01) |
| ***C08F 4/58*** | (2006.01) |
| ***C08F 210/18*** | (2006.01) |

(52) U.S. Cl.
CPC .................. *C08F 4/76* (2013.01); *C08F 2/44* (2013.01); *C08F 4/52* (2013.01); *C08F 4/58* (2013.01); *C08F 210/18* (2013.01); *C08F 2410/04* (2013.01)

(58) Field of Classification Search
CPC ........................................................ C08F 4/76
See application file for complete search history.

(56) References Cited

U.S. PATENT DOCUMENTS

| | | | |
|---|---|---|---|
| 3,645,992 | A | 2/1972 | Elston |
| 3,914,342 | A | 10/1975 | Mitchell |
| 4,076,698 | A | 2/1978 | Anderson et al. |
| 5,064,802 | A | 11/1991 | Stevens et al. |
| 5,066,631 | A | 11/1991 | Sangokoya et al. |
| 5,153,157 | A | 10/1992 | Hlatky et al. |
| 5,272,236 | A | 12/1993 | Lai et al. |
| 5,278,272 | A | 1/1994 | Lai et al. |

(Continued)

FOREIGN PATENT DOCUMENTS

| | | | |
|---|---|---|---|
| CN | 101001885 | A | 7/2007 |
| CN | 102906129 | A | 1/2013 |

(Continued)

OTHER PUBLICATIONS

Bashir et al., Journal of Applied Polymer Science (2018), DOI: 10.1002/app.45670 (9 pages).*

Tritto et al. "Low-temperature 1H and 13C NMR investigation of trimethylaluminium contained in methylaluminoxane cocatalyst for metallocene-based catalysts in olefin polymerization", Macromol. Chem. Phys. 1996, 197, 1537.

Abdulaal et al. Joint Effect of Poly(ethyhlene-co-1-octene) Chain Length and 1-Octene Fraction on High-Temperature Thermal Gradient Interation Chromatography, Macromolecular Chem Phy, 2017, 218, 1600332.

Jordon "Visual Titrimetric Determination of Total Reactivity and Differentiation of Trialkylaluminum and Dialkylaluminum Hydride in Mixtures", Analytical Chemistry 1968, 40 (14), 2150-2153.

(Continued)

*Primary Examiner* — Brian J Davis
(74) *Attorney, Agent, or Firm* — Dinsmore & Shohl LLP

(57) ABSTRACT

Processes of polymerizing olefin monomers. The process comprising reacting ethylene and optionally one or more olefin monomers in the presence of a catalyst system, wherein the catalyst system comprises: an activator; hydrocarbyl-modified methylaluminoxane having less than 25 mole percent trihydrocarbyl aluminum compounds $A1R^{A1}R^{B1}R^{C1}$ based on the total moles of aluminum, where $R^{A1}$, $R^{B1}$, and $R^{C1}$ are independently linear ($C_1$-$C_{40}$)alkyl, branched ($C_1$-$C_{40}$)alkyl, or ($C_6$-$C_{40}$)aryl; and one or more metal-ligand complexes according to formula (I):

(I)

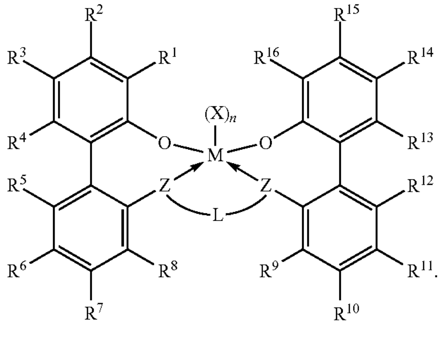

20 Claims, No Drawings

(56) References Cited

U.S. PATENT DOCUMENTS

| | | | |
|---|---|---|---|
| 5,321,106 | A | 6/1994 | LaPointe |
| 5,350,723 | A | 9/1994 | Neithamer et al. |
| 5,425,872 | A | 6/1995 | Devore et al. |
| 5,470,993 | A | 11/1995 | Devore et al. |
| 5,559,199 | A | 9/1996 | Abe et al. |
| 5,565,395 | A | 10/1996 | Sangokoya et al. |
| 5,582,923 | A | 12/1996 | Kale et al. |
| 5,625,087 | A | 4/1997 | Devore et al. |
| 5,721,185 | A | 2/1998 | LaPointe et al. |
| 5,728,855 | A | 3/1998 | Smith et al. |
| 5,733,155 | A | 3/1998 | Sagawa |
| 5,777,143 | A | 7/1998 | Malpass et al. |
| 5,777,413 | A | 7/1998 | Nagata et al. |
| 5,783,512 | A | 7/1998 | Jacobsen et al. |
| 5,854,045 | A | 12/1998 | Fang et al. |
| 5,883,204 | A | 3/1999 | Spencer et al. |
| 5,919,983 | A | 7/1999 | Rosen et al. |
| 5,965,756 | A | 10/1999 | McAdon et al. |
| 6,103,657 | A | 8/2000 | Murray |
| 6,268,444 | B1 | 7/2001 | Klosin et al. |
| 6,320,005 | B1 | 11/2001 | Murray |
| 6,884,857 | B1 | 4/2005 | Stevens et al. |
| 8,202,953 | B2 | 6/2012 | Konze et al. |
| 8,318,896 | B2 | 11/2012 | Winniford et al. |
| 8,354,484 | B2 | 1/2013 | Konze et al. |
| 8,476,076 | B2 | 7/2013 | Van Damme et al. |
| 9,527,941 | B2 | 12/2016 | Demirors et al. |
| 9,631,059 | B2 | 4/2017 | Demirors et al. |
| 9,688,795 | B2 | 6/2017 | Cerk et al. |
| 2004/0010103 | A1 | 1/2004 | Boussie et al. |
| 2004/0220050 | A1 | 11/2004 | Frazier et al. |
| 2009/0299116 | A1 | 12/2009 | Konze et al. |
| 2013/0059991 | A1 | 3/2013 | Ishii et al. |
| 2016/0108185 | A1 | 4/2016 | Wang et al. |
| 2016/0229964 | A1 | 8/2016 | Bellehumeur et al. |
| 2017/0137550 | A1 | 5/2017 | Ewart et al. |
| 2018/0155474 | A1 | 6/2018 | Holtcamp et al. |
| 2019/0241687 | A1 | 8/2019 | Chen et al. |

FOREIGN PATENT DOCUMENTS

| | | | |
|---|---|---|---|
| CN | 105713278 | B | 2/2018 |
| CN | 108059763 | A | 5/2018 |
| CN | 111133010 | A | 5/2020 |
| CN | 111164110 | A | 5/2020 |
| EP | 1935909 | A1 | 6/2008 |
| EP | 2177548 | A1 | 4/2010 |
| EP | 2348057 | A1 | 7/2011 |
| EP | 2567987 | A1 | 3/2013 |
| EP | 2770033 | A1 | 8/2014 |
| EP | 2714226 | B1 | 4/2016 |
| EP | 3772415 | A1 | 2/2021 |
| JP | 2004182963 | A | 7/2004 |
| JP | 2013534934 | A | 9/2013 |
| JP | 2018080234 | A | 5/2018 |
| WO | 1998006726 | A1 | 2/1998 |
| WO | 1999015534 | A1 | 4/1999 |
| WO | 1999042467 | A1 | 8/1999 |
| WO | 2001042315 | A1 | 6/2001 |
| WO | 2002038628 | A2 | 5/2002 |
| WO | 2003040195 | A1 | 5/2003 |
| WO | 2007045415 | A1 | 4/2007 |
| WO | 2007136494 | A2 | 11/2007 |
| WO | 2009029857 | A1 | 3/2009 |
| WO | 2010034463 | A1 | 4/2010 |
| WO | 2012027448 | A1 | 3/2012 |
| WO | 2013023174 | A1 | 2/2013 |
| WO | 2013087531 | A1 | 6/2013 |
| WO | 2015200743 | A1 | 12/2015 |
| WO | 2016003878 | A1 | 1/2016 |
| WO | 2016014749 | A1 | 1/2016 |
| WO | 2017040127 | A1 | 3/2017 |
| WO | 2017058981 | A1 | 4/2017 |
| WO | 2017004462 | A1 | 5/2017 |
| WO | 2018002196 | A1 | 1/2018 |
| WO | 2018022975 | A1 | 2/2018 |
| WO | 2018183056 | A1 | 10/2018 |
| WO | 2019067274 | A1 | 4/2019 |
| WO | 2019070440 | A1 | 4/2019 |
| WO | 2019191068 | A1 | 10/2019 |
| WO | 2020047384 | A1 | 3/2020 |
| WO | 2020139993 | A1 | 7/2020 |

OTHER PUBLICATIONS

Chinese Office Action dated Dec. 12, 2024, pertaining to CN Patent Application No. 202180060263.X, 10 pgs.

Chinese Office Action dated Dec. 18, 2024, pertaining to CN Patent Application No. 202180060770.3, 16 pgs.

Japanese Office Action dated Feb. 4, 2025, pertaining to JP Patent Application No. 2023-503046, 9 pgs.

Japanese Office Action dated Feb. 4, 2025, pertaining to JP Patent Application No. 2023-501555, 10 pgs.

Japanese Office Action dated Feb. 4, 2025, pertaining to JP Patent Application No. 2023-502989, 10 pgs.

Japanese Office Action dated Mar. 11, 2025, pertaining to JP Patent Application No. 2023-501652, 6 pgs.

Chinese Office Action dated Mar. 13, 2025, pertaining to CN Patent Application No. 202180060836.9, 18 pgs.

Chinese Office Action dated Mar. 12, 2025, pertaining to CN Patent Application No. 202180061141.2, 14 pgs.

Thailand Office Action dated Oct. 8, 2024, pertaining to TH Patent Application No. 2301000252, 8 pgs.

Communication pursuant to Article 94(3) EPC dated Oct. 8, 2024, pertaining to EP Patent Application No. 21710099.9, 5 pgs.

Communication pursuant to Article 94(3) EPC dated Oct. 8, 2024, pertaining to EP Patent Application No. 21708873.1, 5 pgs.

Communication pursuant to Article 94(3) EPC dated Oct. 8, 2024, pertaining to EP Patent Application No. 21709542.1, 6 pgs.

Communication pursuant to Article 94(3) EPC dated Oct. 8, 2024, pertaining to EP Patent Application No. 21709541.3, 4 pgs.

Thailand Office Action dated Oct. 28, 2024, pertaining to TH Patent Application No. 2301000143, 12 pgs.

Thailand Office Action dated Oct. 29, 2024, pertaining to TH Patent Application No. 2301000144, 10 pgs.

Thailand Office Action dated Oct. 28, 2024, pertaining to TH Patent Application No. 2301000253, 12 pgs.

International Search Report and Written Opinion dated Apr. 30, 2021, pertaining to Int'l Patent Application No. PCT/US2021/016838, 13 pgs.

International Search Report and Written Opinion dated Aug. 11, 2022, pertaining to Int'l Patent Application No. PCT/US2022/012248, 12 pgs.

Karajala et al. "Detection of low levels of long-chain branching in polyolefins", Annual Technical Conference—Society of Plastics Engineers (2008), 66th 887-891.

Brazil Technical Report dated Aug. 19, 2024, pertaining to BR Patent Application No. BR112023000737-2, 10 pgs.

Brazil Technical Report dated Aug. 28, 2024, pertaining to BR Patent Application No. BR112023000754-2, 10 pgs.

Brazil Technical Report dated Aug. 16, 2024, pertaining to BR Patent Application No. BR112022020685-2, 8 pgs.

Brazil Technical Report dated Aug. 28, 2024, pertaining to BR Patent Application No. BR112023000641-4, 10 pgs.

Bryliakov et al. "Activation of rac-Me2Si(ind)2ZrCI2 by Methylalumoxane Modified by Aluminum Alkyls: An EPR Spin-Probe, IH NMR, and Polymerization Study", Macromol. Chem. Phys. 2006, 207, 327-335.

Busico et al. "Hafnocense and MAO: Beware of Trimethylaluminum!", Macromolecules 2009, 42, 1789-1791.

Cong et al."A New Technique for Characterizing Comonomer Distribution in Polyolefins: High-Temperature Thermal Gradient Interaction Chromatography (HT-TGIC)", Macromolecules, 2011, 44 (8), 3062-3072.

Ghiotto et al. "Probing the Structure of Methylalumoxane (MAO) by a Combined Chemical, Spectroscopic, Neutron Scattering, and Computational Approach", Organometallics 2013, 32(11), 3354-3362.

(56) References Cited

OTHER PUBLICATIONS

Pangborn et al. "Safe and Convenient Procedure for Solvent Purification", Organometallics 1996 15 (5), 1518-1520.
Williams et al. "The Construction of Polyethylene Calibration Curve for Gel Permeation Chromatography Using Polystyrene Fractions", J. Polym. Sci., Polym. Let., 6, 621 (1968).
Zhu et al. "Sythesis and Characterization of Branched Polyethylene by Ethylene Homopolymerization with Monotitanocene and Modified Methylaluminoxane Catlaysts", Macromolecules, American Chemical Society, Washington DC United States, vol. 33, No. 14, Jul. 11, 2000, pp. 5006-5010.
International Search Report and Written Opinion dated Jun. 29, 2021, pertaining to Int'l Patent Application No. PCT/US2021/016789, 15 pgs.
International Search Report and Written Opinion dated May 21, 2021, pertaining to Int'l Patent Application No. PCT/US2021/016814, 15 pgs.
International Search Report and Written Opinion dated Jun. 4, 2021, pertianing to Int'l Patent Application No. PCT/US2021/016820, 15 pgs.
International Search Report and Written Opinion dated Jun. 4, 2021, pertaining to Int'l Patent Application No. PCT/US2021/016775, 16 pgs.
Chinese Office Action dated Apr. 23, 2025, pertaining to CN Patent Application No. 202180060770.3, 12 pgs.
Chinese Office Action dated Apr. 10, 2024, pertaining to CN Patent Application No. 2021800607703, 14 pgs.
US Non-Final Office Action dated Jul. 11, 2025, pertaining to U.S. Appl. No. 18/005,750, 24 pgs.
US Non-Final Office Action dated Jul. 29, 2025, pertaining to U.S. Appl. No. 18/005,759, 11 pgs.
Romano et al., Aluminoxane co-catalysts for the activation of a bis phenoxyimine titanium (IV) catalyst in the synthesis of disentangled ultra-high molecular weight polyethylene. Polymer 74 (2015), 76-85 (Year: 2015).
Striegel et al. "Modern Size-Exclusion Liquid Chromatography", A John Wiley & Sons, Inc., Publication, Second Edition, May 6, 2009, pp. 130-144.
Chinese Notice of Final Rejection dated Jul. 18, 2025, pertaining to CN Patent Application No. 2021800607703, 20 pgs.
Chinese Office Action dated Jul. 22, 2025, pertaining to CN Patent Application No. 202180060263.X, 6 pgs.
Japanese Office Action dated Aug. 5, 2025, pertaining to JP Patent Application No. 2023-501652, 6 pgs.
Chinese Second Office Action dated Sep. 30, 2025, pertaining to CN Patent Application No. 202180060836.9, 22 pgs.
US Non-Final Office Action dated Sep. 10, 2025, pertaining to U.S. Appl. No. 18/005,803, 9 pgs.
US Final Office Action dated Nov. 5, 2025, pertaining to U.S. Appl. No. 18/005,750, 12 pgs.
US Final Office Action dated Nov. 21, 2025, pertaining to U.S. Appl. No. 18/005,759, 6 pgs.
Japanese Office Action dated Dec. 15, 2025, pertaining to JP Patent Application No. 2024-541048, 8 pgs.
Korean Office Action dated Dec. 18, 2025, pertaining to KR Patent Application No. 10-2023-7005190, 9 pgs.
Korean Office Action dated Dec. 9, 2025, pertaining to KR Patent Application No. 10-2023-7005191, 19 pgs.
Brazilian Technical Report dated Nov. 21, 2025, pertaining to BR Patent Application No. BR112024013602.7, 8 pgs.
Korean Office Action dated Dec. 15, 2025, pertaining to KR Patent Application No. 10-2023-7004553, 8 pgs.
Korean Office Action dated Dec. 16, 2025, pertaining to KR Patent Application No. 10-2023-7005189, 11 pgs.
Japanese Office Action dated Dec. 17, 2025, pertaining to JP Patent Application No. 2023-501652, 6 pgs.
Chinese Office Action dated Jan. 12, 2026, pertaining to CN Patent Application No. 202180061141.2, 8 pgs.

* cited by examiner

HYDROCARBYL-MODIFIED METHYLALUMINOXANE COCATALYSTS FOR BIS-PHENYLPHENOXY METAL-LIGAND COMPLEXES

CROSS REFERENCE TO RELATED APPLICATIONS

This application is a National Phase Entry under 35 U.S.C. § 371 of International Patent Application No. PCT/US2021/016814 filed Feb. 5, 2021, which claims priority to U.S. Provisional Patent Application No. 63/053,350 filed on Jul. 17, 2020, the entire disclosures of which are hereby incorporated by reference.

TECHNICAL FIELD

Embodiments of the present disclosure generally relate to catalyst systems includes hydrocarbyl-modified methylaluminoxane, activator, and bis-phenylphenoxy metal-ligand complexes.

BACKGROUND

Since the discovery of Ziegler and Natta on heterogeneous olefin polymerizations, global polyolefin production reached approximately 150 million tons per year in 2015, and it is rising due to increasing market demand. This success is based in part on a series of important breakthroughs in co-catalyst technology. The co-catalysts discovered include aluminoxanes, boranes, and borates with triphenylcarbenium or ammonium cations. These co-catalysts activate the homogeneous single-site olefin polymerization catalysts, and polyolefins have been produced using these co-catalysts in industry.

Modified methylaluminoxanes (MMAO) may be used as impurity scavenger in some PE processes in combination with borate based activators. However, increased amounts of MMAO has been found to have negative impact on the performance of some catalysts, such as bis-phenylphenoxy metal-ligand complexes and negatively impacted the production of polyvinyl resins. The negative impact on the polymerization process includes decreasing catalyst activity, broadening composition distribution of the produced polymer, and negatively affecting the pellet handling.

SUMMARY

There is an ongoing need to create a catalyst system while maintaining catalyst efficiency, reactivity, and the ability to produce polymers with good physical properties.

Embodiments of this disclosure includes processes of polymerizing olefin monomers. In one or more embodiments, the process includes reacting ethylene and optionally one or more olefin monomers in the presence of a catalyst system. The catalyst system includes hydrocarbyl-modified methylaluminoxane, an activator, and a metal-ligand complex. The hydrocarbyl-modified methylaluminoxane having less than 25 mole percent trialkyl aluminum compound $A1R^{A1}R^{B1}R^{C1}$ based on the total moles of aluminum, where $R^{A1}$, $R^{B1}$, and $R^{C1}$ are independently linear $(C_1\text{-}C_{40})$alkyl, branched $(C_1\text{-}C_{40})$alkyl, $(C_1\text{-}C_{40})$aryl, or combinations thereof; and one or more metal-ligand complexes comprising a metal-ligand complex according to formula (I):

(I)

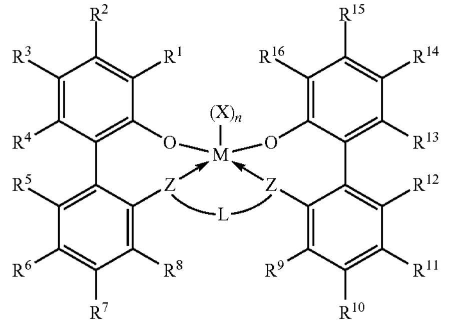

In formula (I), M is titanium, zirconium, hafnium, scandium, yttrium, or an element of the lanthanide series of the periodic table having a formal oxidation state of +2, +3, or +4. Subscript n of $(X)_n$ is 1, 2, or 3. Each X is a monodentate ligand independently chosen from unsaturated $(C_2\text{-}C_{50})$hydrocarbon, unsaturated $(C_2\text{-}C_{50})$heterohydrocarbon, saturated $(C_2\text{-}C_{50})$heterohydrocarbon, $(C_1\text{-}C_{50})$hydrocarbyl, $(C_6\text{-}C_{50})$aryl, $(C_6\text{-}C_{50})$heteroaryl, cyclopentadienyl, substituted cyclopentadienyl, $(C_4\text{-}C_{12})$diene, halogen, $—N(R^N)_2$, and $—N(R^N)C(O)R^C$. Optionally, two X groups may be linked together. The metal-ligand complex is overall charge-neutral. Each Z is independently chosen from —O—, —S—, $—N(R^N)—$, or $—P(R^P)—$. L is $(C_1\text{-}C_{40})$hydrocarbylene or $(C_2\text{-}C_{40})$heterohydrocarbylene.

In formula (I), $R^2$, $R^3$, $R^4$, $R^5$, $R^6$, $R^7$, $R^8$, $R^9$, $R^{10}$, $R^{11}$, $R^{12}$, $R^{13}$, $R^{14}$, and $R^{15}$ are independently selected from —H, $(C_1\text{-}C_{40})$hydrocarbyl, $(C_1\text{-}C_{40})$heterohydrocarbyl, $—Si(R^C)_3$, $—Ge(R^C)_3$, $—P(R^P)_2$, $—N(R^N)_2$$—OR^C$, $—SR^C$, $—NO_2$, —CN, $—CF_3$, $R^CS(O)—$, $R^CS(O)_2—$, $(R^C)_2C{=}N—$, $R^CC(O)O—$, $R^COC(O)—$, $R^CC(O)N(R)—$, $(R^C)_2NC(O)—$, and halogen.

In formula (I), $R^1$ and $R^{16}$ are independently selected from the group consisting of —H, $(C_1\text{-}C_{40})$hydrocarbyl, $(C_1\text{-}C_{40})$heterohydrocarbyl, $—Si(R^C)_3$, $—Ge(R^C)_3$, $—P(R^P)_2$, $—N(R^N)_2$, $—OR^C$, $—SR^C$, $—NO_2$, —CN, $—CF_3$, $R^CS(O)—$, $R^CS(O)_2—$, $—N{=}C(R^C)_2$, $R^CC(O)O—$, $R^COC(O)—$, $R^CC(O)N(R)—$, $(R^C)_2NC(O)—$, halogen, radicals having formula (II), radicals having formula (III), and radicals having formula (IV):

(II)

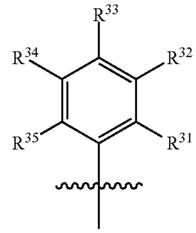

(III)

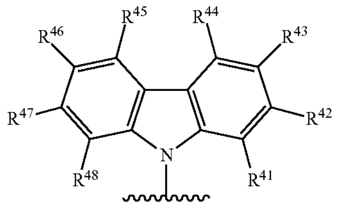

-continued (IV)

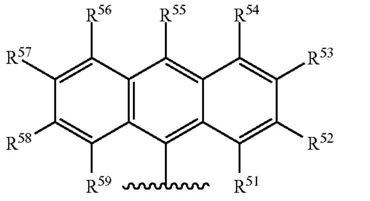

In formulas (II), (III), and (IV), each of $R^{31-35}$, $R^{41-48}$, and $R^{51-59}$ is independently chosen from —H, $(C_1\text{-}C_{40})$hydrocarbyl, $(C_1\text{-}C_{40})$heterohydrocarbyl, —$Si(R^C)_3$, —$Ge(R^C)_3$, $P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C{=}N$—, $R^CC(O)O$—, $R^COC(O)$—, $R^CC(O)N(R^N)$—, $(R^C)_2NC(O)$—, or halogen.

In formulas (I), (II), (III), and (IV), each $R^C$, $R^P$, and $R^N$ in formula (I) is independently a $(C_1\text{-}C_{30})$hydrocarbyl, $(C_1\text{-}C_{30})$heterohydrocarbyl, or —H.

DETAILED DESCRIPTION

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common abbreviations are listed below:

Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; THF: tetrahydrofuran; $Et_2O$: diethyl ether; $CH_2Cl_2$: dichloromethane; CV: column volume (used in column chromatography); EtOAc: ethyl acetate; $C_6D_6$: deuterated benzene or benzene-d6 $CDCl_3$: deuterated chloroform; $Na_2SO_4$: sodium sulfate; $MgSO_4$: magnesium sulfate; HCl hydrogen chloride; n-BuLi: butyllithium; t-BuLi: tert-butyllithium; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days.

The term "independently selected" is used herein to indicate that the R groups, such as, $R^1$, $R^2$, $R^3$, $R^4$, and $R^5$, can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc). A chemical name associated with an R group is intended to convey the chemical structure that is recognized in the art as corresponding to that of the chemical name. Thus, chemical names are intended to supplement and illustrate, not preclude, the structural definitions known to those of skill in the art.

The term "procatalyst" refers to a transition metal compound that has olefin polymerization catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "$(C_x\text{-}C_y)$" means that the unsubstituted form of the chemical group has from x carbon atoms to y carbon atoms, inclusive of x and y. For example, a $(C_1\text{-}C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the "$(C_x\text{-}C_y)$" parenthetical may contain more than y carbon atoms depending on the identity of any groups $R^S$. For example, a "$(C_1\text{-}C_{50})$alkyl substituted with exactly one group $R^S$, where $R^S$ is phenyl (—$C_6H_5$)" may contain from 7 to 56 carbon atoms. Thus, in general when a chemical group defined using the "$(C_x\text{-}C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom of a corresponding unsubstituted compound or functional group is replaced by a substituent (e.g. $R^S$). The term "–H" means a hydrogen or hydrogen radical that is covalently bonded to another atom. "Hydrogen" and "—H" are interchangeable, and unless clearly specified have identical meanings.

The term "$(C_1\text{-}C_{50})$alkyl" means a saturated straight or branched hydrocarbon radical containing from 1 to 50 carbon atoms; and the term "$(C_1\text{-}C_{30})$alkyl" means a saturated straight or branched hydrocarbon radical of from 1 to 30 carbon atoms. Each $(C_1\text{-}C_{50})$alkyl and $(C_1\text{-}C_{30})$alkyl may be unsubstituted or substituted by one or more $R^S$. In some examples, each hydrogen atom in a hydrocarbon radical may be substituted with $R^S$, such as, for example trifluoromethyl. Examples of unsubstituted $(C_1\text{-}C_{50})$alkyl are unsubstituted $(C_1\text{-}C_{20})$alkyl; unsubstituted $(C_1\text{-}C_{10})$alkyl; unsubstituted $(C_1\text{-}C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1\text{-}C_{40})$alkyl are substituted $(C_1\text{-}C_{20})$alkyl, substituted $(C_1\text{-}C_{10})$alkyl, trifluoromethyl, and $[C_{45}]$alkyl. The term "$[C_{45}]$alkyl" means there is a maximum of 45 carbon atoms in the radical, including substituents, and is, for example, a $(C_{27}\text{-}C_{40})$alkyl substituted by one $R^S$, which is a $(C_1\text{-}C_5)$alkyl, such as, for example, methyl, trifluoromethyl, ethyl, 1-propyl, 1-methylethyl, or 1,1-dimethylethyl.

The term $(C_3\text{-}C_{50})$alkenyl means a branched or unbranched, cyclic or acyclic monovalent hydrocarbon radical containing from 3 to 50 carbon atoms, at least one double bond and is unsubstituted or substituted by one or more $R^S$. Examples of unsubstituted $(C_3\text{-}C_{50})$alkenyl: n-propenyl, isopropenyl, n-butenyl, isobutenyl, octenyl, decenyl, cyclopentenyl, cyclopentadienyl, cyclohexenyl, and cyclohexadienyl. Examples of substituted $(C_3\text{-}C_{50})$alkenyl: (2-trifluoromethyl)pent-1-enyl, (3-methyl)hex-1-eneyl, (3-methyl)hexa-1,4-dienyl and (Z)-1-(6-methylhept-3-en-1-yl)cyclohex-1-eneyl.

The term "$(C_3\text{-}C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x\text{-}C_y)$cycloalkyl) are defined in an analogous manner as having from x to y carbon atoms and being either unsubstituted or substituted with one or more $R^S$. Examples of unsubstituted $(C_3\text{-}C_{40})$cycloalkyl are unsubstituted $(C_3\text{-}C_{20})$cycloalkyl, unsubstituted $(C_3\text{-}C_{10})$cycloalkyl, cyclopropyl, cyclobutyl, cyclopentyl, cyclohexyl, cycloheptyl, cyclooctyl, cyclononyl, and cyclodecyl.

Examples of substituted ($C_3$-$C_{40}$)cycloalkyl are substituted ($C_3$-$C_{20}$)cycloalkyl, substituted ($C_3$-$C_{10}$)cycloalkyl, and 1-fluorocyclohexyl.

The term "halogen atom" or "halogen" means the radical of a fluorine atom (F), chlorine atom (Cl), bromine atom (Br), or iodine atom (I). The term "halide" means anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double or triple bonds optionally may be present in substituents $R^S$. The term "unsaturated" means containing one or more carbon-carbon double bonds or carbon-carbon triple bonds, or (in heteroatom-containing groups) one or more carbon-nitrogen double bonds, carbon-phosphorous double bonds, or carbon-silicon double bonds, not including double bonds that may be present in substituents $R^S$, if any, or in aromatic rings or heteroaromatic rings, if any.

The term "hydrocarbyl-modified methylaluminoxane" refers to a methylaluminoxane (MMAO) structure comprising an amount of trihydrocarbyl aluminum. The hydrocarbyl-modified methylaluminoxane includes a combination of a hydrocarbyl-modified methylalurninoxane matrix and trihydrocarbylaluminum. A total molar amount of aluminum in the hydrocarbyl-modified methylaluminoxane is composed of the aluminum contribution from the moles of aluminum from the hydrocarbyl-modified methylaluminoxane matrix and moles of aluminum from the trihydrocarbyl aluminum. The hydrocarbyl-modified methylaluminoxane includes greater than 2.5 mole percent of trihydrocarbylaluminum based on the total moles of aluminum in the hydrocarbyl-modified methylaluminoxane. These additional hydrocarbyl substituents can impact the subsequent aluminoxane structure and result in differences in the distribution and size of aluminoxane clusters (Bryliakov, K. P et. al. *Macromol. Chem. Phys.* 2006, 207, 327-335). The additional hydrocarbyl substituents can also impart increased solubility of the aluminoxane in hydrocarbon solvents such as, but not limited to, hexane, heptane, methylcyclohexane, and ISOPAR E™ as demonstrated in U.S. Pat. No. 5,777,143. Modified methylaluminoxane compositions are generically disclosed and can be prepared as described in U.S. Pat. Nos. 5,066,631 and 5,728,855, both of which are incorporated herein by reference.

Modified methylaluminoxanes (MMAOs) can be described as a mixture of aluminoxane structures and trihydrocarbylaluminum species. Trihydrocarbylaluminum species, like trimethylaluminum are used as scavengers to remove impurities in the polymerization process which may contribute to the deactivation of the olefin polymerization catalyst. However, it is believed that trihydrocarbylaluminum species may be active in some polymerization systems. Catalyst inhibition has been noted when trimethylaluminum is present in propylene homopolymerizations with hafnocene catalysts at 60° C. (Busico, V. et. al. *Macromolecules* 2009, 42, 1789-1791). However, these observations convolute differences in MAO-activation versus borate activation, and even in direct comparison only possibly capture differences between some trimethylaluminum and none. Additionally it is unclear that such observations extend to other catalysts systems, to ethylene polymerization, or to polymerizations conducted at higher temperatures. Regardless, the preference for soluble MAOs necessitates the use of MMAO and hence the presence of trihydrocarbylaluminum species.

Embodiments of this disclosure includes processes of polymerizing olefin monomers. In one or more embodiments, the process includes reacting ethylene and optionally one or more olefin monomers in the presence of a catalyst system.

In various embodiments, the catalyst system does not contain a borate activator.

In some embodiments, the olefin monomer is ($C_3$-$C_{20}$)α-olefin. In other embodiments, the olefin monomer is not ($C_3$-$C_{20}$)α-olefin. In various embodiments, the olefin monomer is cyclic olefin.

In one or more embodiments, the catalyst system includes hydrocarbyl-modified methylaluminoxane and a metal-ligand complex. The hydrocarbyl-modified methylaluminoxane having less than 25 mole percent trialkyl aluminum based on the total moles of aluminum. The trialkyl aluminum has a formula of $A1R^{A1}R^{B1}R^{C1}$, where $R^{A1}$, $R^{B1}$, and $R^{C1}$ are independently linear ($C_1$-$C_{40}$)alkyl, branched ($C_1$-$C_{40}$)alkyl, or ($C_6$-$C_{40}$)aryl. The catalyst system includes one or more metal-ligand complexes according to formula (I):

(I)

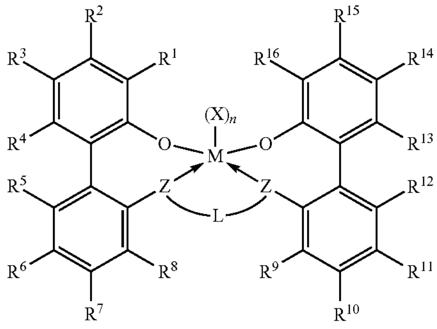

In formula (I), M is titanium, zirconium, hafnium, scandium, yttrium, or an element of the lanthanide series of the periodic table having a formal oxidation state of +2, +3, or +4. Subscript n of $(X)_n$ is 1, 2, or 3. Each X is a monodentate ligand independently chosen from unsaturated ($C_2$-$C_{50}$)hydrocarbon, unsaturated ($C_2$-$C_{50}$)heterohydrocarbon, saturated ($C_2$-$C_{50}$)heterohydrocarbon, ($C_1$-$C_{50}$)hydrocarbyl, ($C_6$-$C_{50}$)aryl, ($C_6$-$C_{50}$)heteroaryl, cyclopentadienyl, substituted cyclopentadienyl, ($C_4$-$C_{12}$)diene, halogen, $—N(R^N)_2$, and $—N(R^N)COR^C$. The metal-ligand complex is overall charge-neutral. Each Z is independently chosen from —O—, —S—, $—N(R^N)—$, or $—P(R^P)—$. L is ($C_1$-$C_{40}$) hydrocarbylene or ($C_2$-$C_{40}$)heterohydrocarbylene.

In formula (I), $R^2$, $R^3$, $R^4$, $R^5$, $R^6$, $R^7$, $R^8$, $R^9$, $R^{10}$, $R^{11}$, $R^{12}$, $R^{13}$, $R^{14}$, and $R^{15}$ are independently selected from —H, ($C_1$-$C_{40}$)hydrocarbyl, ($C_1$-$C_{40}$)heterohydrocarbyl, $—Si(R^C)_3$, $—Ge(R^C)_3$, $P(R^P)_2$, $—N(R^N)_2$, $—OR^C$, $—SR^C$, $—NO_2$, —CN, $—CF_3$, $R^CS(O)—$, $RCS(O)_2—$, $(R^C)_2C{=}N—$, $R^CC(O)O—$, $R^COC(O)—$, $R^CC(O)N(R)—$, $(R^C)_2NC(O)—$, and halogen.

In formula (I), $R^1$ and $R^{16}$ are independently selected from the group consisting of —H, ($C_1$-$C_{40}$)hydrocarbyl, ($C_1$-$C_{40}$) heterohydrocarbyl, $—Si(R^C)_3$, $—Ge(R^C)_3$, $P(R^P)_2$, $—N(R^N)_2$, $—OR^C$, $—SR^C$, $—NO_2$, —CN, $—CF_3$, $R^CS(O)—$, $R^CS(O)_2—$, $—N{=}C(R^C)_2$, $R^CC(O)O—$, $R^COC(O)—$, $R^CC(O)N(R)—$, $(R^C)_2NC(O)—$, halogen, radicals having formula (II), radicals having formula (III), and radicals having formula (IV):

(II)

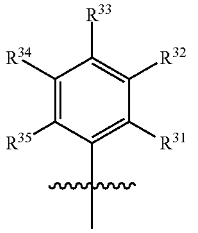

(III)

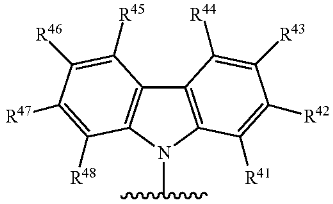

(IV)

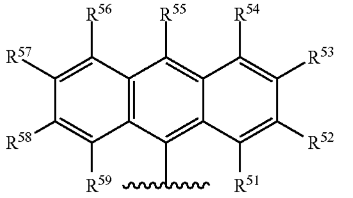

When present in the metal-ligand complex of formula (I) as part of a radical having formula (II), formula (III), or formula (IV), the groups $R^{31-35}$, $R^{41-48}$, and $R^{51-59}$ of the metal-ligand complex of formula (I) are each independently chosen from $(C_1-C_{40})$hydrocarbyl, $(C_1-C_{40})$heterohydrocarbyl, $—Si(R^C)_3$, $—P(R^P)_2$, $—N(R^N)_2$, $—OR^C$, $—SR^C$, $NO_2$, —CN, $—CF_3$, $R^CS(O)—$, $R^CS(O)_2—$, $(R^C)_2C{=}N—$, $R^CC(O)O—$, $R^COC(O)—$, $R^CC(O)N(R^N)—$, $(R^N)_2NC(O)—$, halogen, hydrogen (—H), or combinations thereof. Independently each $R^C$, $R^P$, and $R^N$ unsubstituted $(C_1-C_{18})$hydrocarbyl, $(C_1-C_{30})$heterohydrocarbyl, or —H.

In formulas (I), (II), (III), and (IV), each $R^C$, $R^P$, and $R^N$ in formula (I) is independently a $(C_1-C_{30})$hydrocarbyl, $(C_1-C_{30})$heterohydrocarbyl, or —H.

In embodiments, the hydrocarbyl-modified methylaluminoxane in the polymerization process has less than 20 mole percent of trialkyl aluminum based on the total moles of aluminum. In some embodiments, the hydrocarbyl-modified methylaluminoxane has less than 15 mole percent of trialkyl aluminum based on the total mole of hydrocarbyl-modified methylaluminoxane. In one or more embodiments, the hydrocarbyl-modified methylaluminoxane has less than 10 mole percent of trialkyl aluminum based on the total mole of hydrocarbyl-modified methylaluminoxane. In various embodiments, the hydrocarbyl-modified methylaluminoxane is modified methylaluminoxane.

In some embodiments, the trialkyl aluminum has a formula of $A1R^{A1}R^{B1}R^{C1}$, where $R^{A1}$, $R^{B1}$, and $R^{C1}$ are independently $(C_1-C_{10})$alkyl. In one or more embodiments, $R^{A1}$, $R^{B1}$, and $R^{C1}$ are independently methyl, ethyl, propyl, 2-propyl, butyl, tert-butyl, or octyl. In some embodiment, $R^{A1}$, $R^{B1}$, and $R^{C1}$ are the same. In other embodiments, at least one of $R^{A1}$, $R^{B1}$, and $R^{C1}$ is different from the other $R^{A1}$, $R^{B1}$, and $R^{C1}$.

In various embodiments, the ratio of moles of aluminum in the hydrocarbyl-modified methylaluminoxane to moles of metal in the metal-ligand complex is greater than 10. In some embodiments, the ratio of moles of aluminum in the hydrocarbyl-modified methylaluminoxane to moles of metal in the metal-ligand complex is less than 500. In one more embodiments, the ratio of moles of aluminum in the hydrocarbyl-modified methylaluminoxane to moles of metal in the metal-ligand complex is from greater than 20 to less than 300.

The groups $R^1$ and $R^{16}$ in the metal-ligand complex of formula (I) are chosen independently of one another. For example, $R^1$ may be chosen from a radical having formula (II), (III), or (IV) and $R^{16}$ may be a $(C_1-C_{40})$hydrocarbyl; or $R^1$ may be chosen from a radical having formula (II), (III), or (IV) and $R^{16}$ may be chosen from a radical having formula (II), (III), or (IV) the same as or different from that of $R^1$. Both $R^1$ and $R^{16}$ may be radicals having formula (II), for which the groups $R^{31-35}$ are the same or different in $R^1$ and $R^{16}$. In other examples, both $R^1$ and $R^{16}$ may be radicals having formula (III), for which the groups $R^{41-48}$ are the same or different in $R^1$ and $R^{16}$; or both $R^1$ and $R^{16}$ may be radicals having formula (IV), for which the groups $R^{51-59}$ are the same or different in $R^1$ and $R^{16}$.

In some embodiments, at least one of $R^1$ and $R^{16}$ is a radical having formula (II), where $R^{32}$ and $R^{34}$ are tert-butyl. In one or more embodiments, $R^{32}$ and $R^{34}$ are $(C_1-C_{12})$hydrocarbyl or $—Si[(C_1-C_{10})alkyl]_3$.

In some embodiments, when at least one of $R^1$ or $R^{16}$ is a radical having formula (III), one of or both of $R^{43}$ and $R^{46}$ is tert-butyl and $R^{41-42}$, $R^{44-45}$, and $R^{47-48}$ are —H. In other embodiments, one of or both of $R^{42}$ and $R^{47}$ is tert-butyl and $R^{41}$, $R^{43-46}$, and $R^{48}$ are —H. In some embodiments, both $R^{42}$ and $R^{47}$ are —H. In various embodiments, $R^{42}$ and $R^{47}$ are $(C_1-C_{20})$hydrocarbyl or $—Si[(C_1-C_{10})alkyl]_3$. In other embodiments, $R^{43}$ and $R^{46}$ are $(C_1-C_{20})$hydrocarbyl or $—Si(C_1-C_{10})alkyl]_3$.

In embodiments, when at least one of $R^1$ or $R^{16}$ is a radical having formula (IV), each $R^{52}$, $R^{53}$, $R^{55}$, $R^{57}$, and $R^{58}$ are —H, $(C_1-C_{20})$hydrocarbyl, $—Si[(C_1-C_{20})hydrocarbyl]_3$, or $—Ge[(C_1-C_{20})hydrocarbyl]_3$. In some embodiments, at least one of $R^{52}$, $R^{53}$, $R^{55}$, $R^{57}$, and $R^{58}$ is $(C_3-C_{10})$alkyl, $—Si[(C_3-C_{10})alkyl]_3$, or $—Ge[(C_3-C_{10})alkyl]_3$. In one or more embodiments, at least two of $R^{52}$, $R^{53}$, $R^{55}$, $R^{57}$, and $R^{58}$ is a $(C_3-C_{10})$alkyl, $—Si[(C_3-C_{10})alkyl]_3$, or $—Ge[(C_3-C_{10})alkyl]_3$. In various embodiments, at least three of $R^{52}$, $R^{53}$, $R^{55}$, $R^{57}$, and $R^{58}$ is a $(C_3-C_{10})$alkyl, $—Si[(C_3-C_{10})alkyl]_3$, or $—Ge[(C_3-C_{10})alkyl]_3$.

In some embodiments, when at least one of $R^1$ or $R^{16}$ is a radical having formula (IV), at least two of $R^{52}$, $R^{53}$, $R^{55}$, $R^{57}$, and $R^{58}$ are $(C_1-C_{20})$hydrocarbyl or $—C(H)_2Si[(C_1-C_{20})hydrocarbyl]_3$.

Examples of $(C_3-C_{10})$alkyl include, but are not limited to: propyl, 2-propyl (also called iso-propyl), 1,1-dimethylethyl (also called tert-butyl), cyclopentyl, cyclohexyl, 1-butyl, pentyl, 3-methylbutyl, hexyl, 4-methylpentyl, heptyl, n-octyl, tert-octyl (also called 2,4,4-trimethylpentan-2-yl), nonyl, and decyl.

In formula (I), $R^2$, $R^3$, $R^4$, $R^5$, $R^6$, $R^7$, $R^8$, $R^9$, $R^{10}$, $R^{11}$, $R^{12}$, $R^{13}$, $R^{14}$, and $R^{15}$ is independently selected from —H, $(C_1-C_{40})$hydrocarbyl, $(C_1-C_{40})$heterohydrocarbyl, $—Si(R^C)_3$, $—Ge(R^C)_3$, $P(R^P)_2$, $—N(R^N)_2$, $—OR^C$, $—SR^C$, $—NO_2$, —CN, $—CF_3$, $R^CS(O)—$, $R^CS(O)_2—$, $(R^C)_2C{=}N—$, $R^CC(O)O—$, $R^COC(O)—$, $R^CC(O)N(R)—$, $(R^C)_2NC(O)—$, and halogen.

In one or more embodiments, $R^2$, $R^4$, $R^5$, $R^{12}$, $R^{13}$, and $R^{15}$ are hydrogen; and each Z is oxygen.

In various embodiments, at least one of $R^5$, $R^6$, $R^7$, and $R^8$ is a halogen atom; and at least one of $R^9$, $R^{10}$, $R^1$, and $R^{12}$ is a halogen atom. In some embodiments, $R^8$ and $R^9$ are independently $(C_1-C_4)$alkyl.

In some embodiments, $R^3$ and $R^{14}$ are $(C_1-C_{20})$alkyl. In one or more embodiments, $R^3$ and $R^{14}$ are methyl and $R^6$ and $R^{11}$ are halogen. In embodiments, $R^6$ and $R^{11}$ are tert-butyl. In other embodiments, $R^3$ and $R^{14}$ are tert-octyl or n-octyl.

In various embodiments, $R^3$ and $R^{14}$ are $(C_1-C_{24})$alkyl. In one or more embodiments, $R^3$ and $R^{14}$ are $(C_4-C_{24})$alkyl. In some embodiments, $R^3$ and $R^{14}$ are 1-propyl, 2-propyl (also called iso-propyl), 1,1-dimethylethyl (also called tert-butyl), cyclopentyl, cyclohexyl, 1-butyl, pentyl, 3-methyl-1-butyl, hexyl, 4-methyl-1-pentyl, heptyl, n-octyl, tert-octyl (also called 2,4,4-trimethylpentan-2-yl), nonyl, and decyl. In embodiments, $R^3$ and $R^{14}$ are —$OR^C$, wherein $R^C$ is $(C_1-C_{20})$hydrocarbon, and in some embodiments, $R^C$ is methyl, ethyl, 1-propyl, 2-propyl (also called iso-propyl), or 1,1-dimethylethyl.

In one or more embodiments, one of $R^8$ and $R^9$ is not —H. In various embodiments, at least one of $R^8$ and $R^9$ is $(C_1-C_{24})$alkyl. In some embodiments, both $R^8$ and $R^9$ are $(C_1-C_{24})$alkyl. In some embodiments, $R^8$ and $R^9$ are methyl. In other embodiments, $R^8$ and $R^9$ are halogen.

In some embodiments, $R^3$ and $R^{14}$ are methyl; In one or more embodiments, $R^3$ and $R^{14}$ are $(C_4-C_{24})$alkyl. In some embodiments, $R^8$ and $R^9$ are 1-propyl, 2-propyl (also called iso-propyl), 1,1-dimethylethyl (also called tert-butyl), cyclopentyl, cyclohexyl, 1-butyl, pentyl, 3-methyl-1-butyl, hexyl, 4-methyl-1-pentyl, heptyl, n-octyl, tert-octyl (also called 2,4,4-trimethylpentan-2-yl), nonyl, and decyl.

In various embodiments, in the metal-ligand complex of formula (I), $R^6$ and $R^{11}$ are halogen. In some embodiments, $R^6$ and $R^{11}$ are $(C_1-C_{24})$alkyl. In various embodiments, $R^6$ and $R^{11}$ independently are chosen from methyl, ethyl, 1-propyl, 2-propyl (also called iso-propyl), 1,1-dimethylethyl (also called tert-butyl), cyclopentyl, cyclohexyl, 1-butyl, pentyl, 3-methylbutyl, hexyl, 4-methylpentyl, heptyl, n-octyl, tert-octyl (also called 2,4,4-trimethylpentan-2-yl), nonyl, and decyl. In some embodiments, $R^6$ and $R^{11}$ are tert-butyl. In embodiments, $R^6$ and $R^{11}$ are —$OR^C$, wherein $R^C$ is $(C_1-C_{20})$hydrocarbyl, and in some embodiments, $R^C$ is methyl, ethyl, 1-propyl, 2-propyl (also called iso-propyl), or 1,1-dimethylethyl. In other embodiments, $R^6$ and $R^{11}$ are —$SiR^C{}_3$, wherein each $R^C$ is independently $(C_1-C_{20})$hydrocarbyl, and in some embodiments, $R^C$ is methyl, ethyl, 1-propyl, 2-propyl (also called iso-propyl), or 1,1-dimethylethyl.

In some embodiments, any or all of the chemical groups (e.g., X and $R^{1-59}$) of the metal-ligand complex of formula (I) may be unsubstituted. In other embodiments, none, any, or all of the chemical groups X and $R^{1-59}$ of the metal-ligand complex of formula (I) may be substituted with one or more than one $R^S$. When two or more than two $R^S$ are bonded to a same chemical group of the metal-ligand complex of formula (I), the individual $R^S$ of the chemical group may be bonded to the same carbon atom or heteroatom or to different carbon atoms or heteroatoms. In some embodiments, none, any, or all of the chemical groups X and $R^{1-59}$ may be persubstituted with $R^S$. In the chemical groups that are persubstituted with $R^S$, the individual $R^S$ may all be the same or may be independently chosen. In one or more embodiments, $R^S$ is chosen from $(C_1-C_{20})$hydrocarbyl, $(C_1-C_{20})$alkyl, $(C_1-C_{20})$heterohydrocarbyl, or $(C_1-C_{20})$heteroalkyl.

In formula (I), L is $(C_1-C_{40})$hydrocarbylene or $(C_1-C_{40})$heterohydrocarbylene; and each Z is independently chosen from —O—, —S—, —$N(R^N)$—, or —$P(R^P)$—. In one or more embodiments, L includes from 1 to 10 atoms.

In formulas (I), (II), (III), and (IV), each $R^C$, $R^P$, and $R^N$ is independently a $(C_1-C_{30})$hydrocarbyl, $(C_1-C_{30})$heterohydrocarbyl, or —H.

In some embodiments of formula (I), the L may be chosen from $(C_3-C_7)$alkyl 1,3-diradicals, such as —$CH_2CH_2CH_2$—, —$CH(CH_3)CH_2C^*H(CH_3)$, —$CH(CH_3)CH(CH_3)C^*H(CH_3)$, —$CH_2C(CH_3)_2CH_2$—, cyclopentan-1,3-diyl, or cyclohexan-1,3-diyl, for example. In some embodiments, the L may be chosen from $(C_4-C_{10})$alkyl 1,4-diradicals, such as —$CH_2CH_2CH_2CH_2$—, —$CH_2C(CH_3)_2C(CH_3)_2CH_2$—, cyclohexane-1,2-diyldimethyl, and bicyclo[2.2.2]octane-2,3-diyldimethyl, for example. In some embodiments, L may be chosen from $(C_5-C_{12})$alkyl 1,5-diradicals, such as —$CH_2CH_2CH_2CH_2CH_2$—, and 1,3-bis(methylene)cyclohexane. In some embodiments, L may be chosen from $(C_6-C_{14})$alkyl 1,6-diradicals, such as —$CH_2CH_2CH_2CH_2CH_2CH_2$— or 1,2-bis(ethylene)cyclohexane, for example.

In one or more embodiments, L is $(C_2-C_{40})$heterohydrocarbylene, and at least one of the from 2 to 10 atoms includes a heteroatom. In some embodiments, L is —$CH_2Ge(R^C)_2CH_2$—, where each $R^C$ is $(C_1-C_{30})$hydrocarbyl. In some embodiments, L is —$CH_2Ge(CH_3)_2CH_2$—, —$CH_2Ge(ethyl)_2CH_2$—, —$CH_2Ge(2\text{-propyl})_2CH_2$—, —$CH_2Ge(t\text{-butyl})_2CH_2$—, —$CH_2Ge(cyclopentyl)_2CH_2$—, or —$CH_2Ge(cyclohexyl)_2CH_2$—.

In one or more embodiments, L is chosen from —$CH_2$—; —$CH_2CH_2$—; —$CH_2(CH_2)_mCH_2$—, —$CH_2(CHR^C)_mCH_2$—, —$CH_2(CRC_2)_mCH_2$—, where m is from 1 to 3; —$CH_2Si(R^C)_2CH_2$—; —$CH_2Ge(R^C)_2CH_2$—; —$CH(CH_3)CH_2CH^*(CH_3)$; and —$CH_2$(phen-1,2-di-yl)$CH_2$—; where each $R^C$ in L is $(C_1-C_{20})$hydrocarbyl.

Examples of such $(C_1-C_{12})$alkyl include, but are not limited to methyl, ethyl, 1-propyl, 2-propyl (also called iso-propyl), 1,1-dimethylethyl, cyclopentyl, or cyclohexyl, butyl, tert-butyl, pentyl, hexyl, heptyl, n-octyl, tert-octyl (also called 2,4,4-trimethylpent-2-yl), nonyl, decyl, undecyl, and dodecyl.

In some embodiments, in the metal-ligand complex according to formula (I), both $R^8$ and $R^9$ are methyl. In other embodiments, one of $R^8$ and $R^9$ is methyl and the other of $R^8$ and $R^9$ is —H.

In the metal-ligand complex according to formula (I), X bonds with M through a covalent bond or an ionic bond. In some embodiments, X may be a monoanionic ligand having a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, carbonate, phosphate, sulfate, $HC(O)O^-$, $HC(O)N(H)^-$, $(C_1-C_{40})$hydrocarbyl$C(O)N(H)^-$, $(C_1-C_{10})$hydrocarbyl$C(O)N((C_1-C_{20})$hydrocarbyl$)^-$, $(C_1-C_{40})$hydrocarbyl$C(O)N(H)^-$, $R^KR^LB^-$, $R^KR^LN^-$, $R^KO^-$, $R^KS^-$, $R^KR^LP^-$, or $R^MR^KR^LSi^-$, where each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{20})$heterohydrocarbylene and $R^M$ is as defined above.

In some embodiments, X is a halogen, unsubstituted $(C_1-C_{20})$hydrocarbyl, unsubstituted $(C_1-C_{20})$hydrocarbyl$C(O)O$—, or $R^KR^LN^-$, wherein each of $R^K$ and $R^L$ independently is an unsubstituted$(C_1-C_{20})$hydrocarbyl. In some embodiments, each monodentate ligand X is a chlorine atom, $(C_1-C_{10})$hydrocarbyl (e.g., $(C_1-C_6)$alkyl or benzyl), unsubstituted $(C_1-C_{10})$hydrocarbyl$C(O)O$—, or $R^KR^LN^-$, wherein each of $R^K$ and $R^M$ independently is an unsubstituted $(C_1-C_{10})$hydrocarbyl.

In further embodiments, X is selected from methyl; ethyl; 1-propyl; 2-propyl; 1-butyl; 2,2,-dimethylpropyl; trimethylsilylmethyl; phenyl; benzyl; or chloro. X is methyl; ethyl; 1-propyl; 2-propyl; 1-butyl; 2,2,-dimethylpropyl; trimethylsilylmethyl; phenyl; benzyl; and chloro. In one embodiment, n is 2 and at least two X independently are monoanionic monodentate ligands. In a specific embodiment, n is 2 and the two X groups join to form a bidentate ligand. In further embodiments, the bidentate ligand is 2,2-dimethyl-2-silapropane-1,3-diyl or 1,3-butadiene.

In one or more embodiments, each X is independently $—(CH_2)SiR^X_3$, in which each $R^X$ is independently a $(C_1-C_{30})$alkyl or a $(C_1-C_{30})$heteroalkyl and at least one $R^X$ is $(C_1-C_{30})$alkyl. In some embodiments, when one of $R^X$ is a $(C_1-C_{30})$heteroalkyl, the heteroatom is silica or oxygen atom. In some embodiments, $R^X$ is methyl, ethyl, propyl, 2-propyl, butyl, 1,1-dimethylethyl (or tert-butyl), pentyl, hexyl, heptyl, n-octyl, tert-octyl, or nonyl.

In one or more embodiments X is $—(CH_2)Si(CH_3)_3$, $—(CH_2)Si(CH_3)_2(CH_2CH_3)$; $—(CH_2)Si(CH_3)(CH_2CH_3)_2$, $—(CH_2)Si(CH_2CH_3)_3$, $—(CH_2)Si(CH_3)_2$(n-butyl), $—(CH_2)Si(CH_3)_2$(n-hexyl), $—(CH_2)Si(CH_3)$(n-Oct)$R^X$, $—(CH_2)Si$(n-Oct)$R^X_2$, $—(CH_2)Si(CH_3)_2$(2-ethylhexyl), $—(CH_2)Si(CH_3)_2$(dodecyl), $—CH_2Si(CH_3)_2CH_2Si(CH_3)_3$ (herein referred to as $—CH_2Si(CH_3)_2CH_2$TMS). Optionally, in some embodiments, the metal-ligand complex according to formula (I), exactly two $R^X$ are covalently linked or exactly three $R^X$ are covalently linked.

In some embodiments, X is $—CH_2Si(R^C)_{3-Q}(OR^C)_Q$, $Si(R^C)_{3-Q}(OR^C)_Q$, $—OSi(R^C)_{3-Q}(OR^C)_Q$, in which subscript Q is 0, 1, 2 or 3 and each $R^C$ is independently a substituted or unsubstituted $(C_1-C_{30})$hydrocarbyl, or a substituted or unsubstituted $(C_1-C_{30})$heterohydrocarbyl.

Cocatalyst Component

The catalyst system comprising a metal-ligand complex of formula (I) may be rendered catalytically active by any technique known in the art for activating metal-based catalysts of olefin polymerization reactions. For example, the procatalyst according to a metal-ligand complex of formula (I) may be rendered catalytically active by contacting the complex to, or combining the complex with, an activating co-catalyst. Additionally, the metal-ligand complex according to formula (I) includes both a procatalyst form, which is neutral, and a catalytic form, which may be positively charged due to the loss of a monoanionic ligand, such a benzyl, methyl, or phenyl. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activating co-catalysts include Group 13 metal compounds containing $(C_1-C_{20})$hydrocarbyl substituents as described herein. In some embodiments, Group 13 metal compounds are tri($(C_1-C_{20})$hydrocarbyl)-substituted-aluminum or tri($(C_1-C_{20})$hydrocarbyl)-boron compounds. In other embodiments, Group 13 metal compounds are tri(hydrocarbyl)-substituted-aluminum, tri($(C_1-C_{20})$hydrocarbyl)-boron compounds, tri($(C_1-C_{10})$alkyl)aluminum, tri($(C_6-C_{18})$aryl) boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris($(C_1-C_2c)$hydrocarbyl borate (e.g. trityl tetrafluoroborate) or a tri($(C_1-C_{20})$hydrocarbyl)ammonium tetra($(C_1-C_{20})$hydrocarbyl)borane (e.g. bis(octadecyl)methylammonium tetrakis(pentafluorophenyl)borane). As used herein, the term "ammonium" means a nitrogen cation that is a $((C_1-C_{20})\text{hydrocarbyl})_4N^+$ a $((C_1-C_{20})\text{hydrocarbyl})_3N(H)^+$, a $((C_1-C_{20})\text{hydrocarbyl})_2N(H)_2^-$, $(C_1-C_{20})\text{hydrocarbyl}N(H)_3^+$, or $N(H)_4^-$, wherein each $(C_1-C_{20})$hydrocarbyl, when two or more are present, may be the same or different.

Combinations of neutral Lewis acid activating co-catalysts include mixtures comprising a combination of a tri($(C_1-C_4)$alkyl)aluminum and a halogenated tri($(C_6-C_{18})$aryl) boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentatluorophenyl)borane with a polymeric or oligomeric alumoxane. Ratios of numbers of moles of (metal-ligand complex): (tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The catalyst system that includes the metal-ligand complex of formula (I) may be activated to form an active catalyst composition by combination with one or more cocatalysts, for example, a cation forming cocatalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methylammonium tetrakis(pentafluorophenyl)borate, and combinations thereof.

In some embodiments, more than one of the foregoing activating co-catalysts may be used in combination with each other. A specific example of a co-catalyst combination is a mixture of a tri($(C_1-C_4)$hydrocarbyl)aluminum, tri($(C_1-C_4)$hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of rmoles of the metal-ligand complex of formula (I). When tris(pentafluorophenyl)borane alone is used as the activating co-catalyst, in some other embodiments, the number of moles of the tris(pentafluorophenyl) borane in the reaction to the total number of moles of the one or more metal-ligand complexes of formula (I) in the reaction is from 0.5: 1 to 10:1, from 1:1 to 6:1, or from 1:1 to 5:1. The remaining activating co-catalysts are generally employed in mole quantities approximately equal to the total mole quantities of the one or more metal-ligand complexes of formula (I).

Polyolefins

The catalytic systems described in the preceding paragraphs are utilized in the polymerization of olefins, primarily ethylene and propylene, to form ethylene-based polymers or propylene-based polymers. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene-based polymers, for example homopolymers and/or interpolymers (including copolymers) of ethylene and optionally one or more co-monomers such as α-olefins, may comprise from at least 50 mole percent (mol %) monomer units derived from ethylene. All individual values and subranges encompassed by "from at least 50 mole percent" are disclosed herein as separate embodiments; for example, the ethylene based polymers, homopolymers and/or interpolymers (including copolymers) of ethylene and optionally one or more co-monomers such as α-olefins may comprise at least 60 mole percent monomer units derived from ethylene; at least 70 mole percent monomer units derived from ethylene; at least 80 mole percent monomer units derived from ethylene; or from 50 to 100 mole percent monomer units derived from ethylene; or from 80 to 100 mole percent monomer units derived from ethylene.

In some embodiments, the ethylene-based polymers may comprise at least 90 mole percent units derived from ethylene. All individual values and subranges from at least 90 mole percent are included herein and disclosed herein as separate embodiments. For example, the ethylene based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments of the ethylene-based polymer, the amount of additional α-olefin is less than 50 mol %; other embodiments include at least 1 mole percent (mol %) to 25 mol %; and in further embodiments the amount of additional α-olefin includes at least 5 mol % to 103 mol %. In some embodiments, the additional α-olefin is 1-octene.

Any conventional polymerization processes may be employed to produce the ethylene based polymers. Such conventional polymerization processes include, but are not limited to, solution polymerization processes, slurry phase polymerization processes, and combinations thereof using one or more conventional reactors such as loop reactors, isothermal reactors, stirred tank reactors, batch reactors in parallel, series, or any combinations thereof, for example.

In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene based polymer may be produced via solution polymerization in a single reactor system, for example a single loop reactor system, in which ethylene and optionally one or more α-olefins are polymerized in the presence of the catalyst system, as described within this disclosure, and optionally one or more co-catalysts, as described in the preceding paragraphs.

The ethylene based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene based polymers may contain any amounts of additives. The ethylene based polymers may compromise from about 0 to about 10 percent by the combined weight of such additives, based on the weight of the ethylene based polymers and the one or more additives. The ethylene based polymers may further comprise fillers, which may include, but are not limited to, organic or inorganic fillers. The ethylene based polymers may contain from about 0 to about 20 weight percent fillers such as, for example, calcium carbonate, talc, or $Mg(OH)_2$, based on the combined weight of the ethylene based polymers and all additives or fillers. The ethylene based polymers may further be blended with one or more polymers to form a blend.

In some embodiments, a polymerization process for producing an ethylene-based polymer may include polymerizing ethylene and at least one additional α-olefin in the presence of a catalyst system according to the present disclosure. The polymer resulting from such a catalyst system that incorporates the metal-ligand complex of formula (I) may have a density according to ASTM D792 (incorporated herein by reference in its entirety) from 0.850 g/cm$^3$ to 0.970 g/cm$^3$, from 0.880 g/cm$^3$ to 0.920 g/cm$^3$, from 0.880 g/cm$^3$ to 0.910 g/cm$^3$, or from 0.880 g/cm$^3$ to 0.900 g/cm$^3$, for example.

In another embodiment, the polymer resulting from the catalyst system according to the present disclosure has a melt flow ratio (110/12) from 5 to 15, where the melt index, 12, is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio (110/12) is from 5 to 10, and in others, the melt flow ratio is from 5 to 9.

In some embodiments, the polymer resulting from the catalyst system according to the present disclosure has a molecular-weight distribution (MWD) from 1 to 25, where MWD is defined as $M_w/M_n$ with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Embodiments of the catalyst systems described in this disclosure yield unique polymer properties as a result of the high molecular weights of the polymers formed and the amount of the co-monomers incorporated into the polymers.

Procedure for Continuous Process Reactor Polymerization: Raw materials (ethylene, 1-octene) and the process solvent (a narrow boiling range high-purity isoparaffinic solvent trademarked ISOPAR E commercially available from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized to above reaction pressure. The solvent and comonomer feed is pressurized to above reaction pressure. The individual catalyst components (metal-ligand complexes and cocatalysts) are manually batch diluted to specified component concentrations with purified solvent and pressured to above reaction pressure. All reaction feed flows are measured with mass flow meters and independently controlled with computer automated valve control systems.

The continuous solution polymerizations are carried out in a continuously stirred-tank reactor (CSTR). The combined solvent, monomer, comonomer and hydrogen feed to the reactor is temperature controlled between 5° C. and 50° C. and is typically 15-25° C. All of the components are fed to the polymerization reactor with the solvent feed. The catalyst is fed to the reactor to reach a specified conversion of ethylene. The cocatalyst component(s) is/are fed separately based on a calculated specified molar ratios or ppm amounts. The effluent from the polymerization reactor (containing solvent, monomer, comonomer, hydrogen, catalyst components, and polymer) exits the reactor and is contacted with water. In addition, various additives such as antioxidants, can be added at this point. The stream then goes through a static mixer to evenly disperse the mixture.

Following additive addition, the effluent (containing solvent, monomer, comonomer, hydrogen, catalyst components, and molten polymer) passes through a heat exchanger to raise the stream temperature in preparation for separation of the polymer from the other lower-boiling components. The stream then passes through the reactor pressure control valve, across which the pressure is greatly reduced. From there, it enters a two stage separation system consisting of a devolatizer and a vacuum extruder, where solvent and unreacted hydrogen, monomer, comonomer, and water are removed from the polymer. At the exit of the extruder, the strand of molten polymer formed goes through a cold-water bath, where it solidifies. The strand is then fed through a strand chopper, where the polymer is cut it into pellets after being air-dried.

Procedure for Batch Reactor Polymerization. Raw materials (ethylene, 1-octene) and the process solvent (ISOPAR E) are purified with molecular sieves before introduction into the reaction environment. A stirred autoclave reactor was charged with ISOPAR E, and 1-octene. The reactor was then heated to a temperature and charged with ethylene to reach a pressure. Optionally, hydrogen was also added. The catalyst system was prepared in a drybox under inert atmosphere by mixing the metal-ligand complex and optionally one or more additives, with additional solvent. The catalyst system was then injected into the reactor. The reactor pressure and temperature were kept constant by feeding ethylene during the polymerization and cooling the reactor as needed. After 10 minutes, the ethylene feed was shut off and the solution transferred into a nitrogen-purged resin kettle. The polymer was thoroughly dried in a vacuum oven, and the reactor was thoroughly rinsed with hot ISOPAR E between polymerization runs.

Test Methods

Unless otherwise indicated herein, the following analytical methods are used in describing aspects of the present disclosure:

Melt Index

Melt indices $I_2$ (or $I_2$) and $I_{10}$ (or I10) of polymer samples were measured in accordance to ASTM D-1238 (method B) at 190° C. and at 2.16 kg and 10 kg load, respectively. Their values are reported in g/10 min.

Density

Samples for density measurement were prepared according to ASTM D4703. Measurements were made, according to ASTM D792, Method B, within one hour of sample pressing.

Gel Permeation Chromatography (GPC)

The chromatographic system consisted of a PolymerChar GPC-IR (Valencia, Spain) high temperature GPC chromatograph equipped with an internal IR5 infra-red detector (IR5). The autosampler oven compartment was set at 160° Celsius and the column compartment was set at 150° Celsius. The columns used were 4 Agilent "Mixed A" 30 cm 20-micron linear mixed-bed columns and a 20-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)).:

$$M\_polyethylene=A\times(M\_polystyrene)^\wedge B \quad \text{(EQ 1)}$$

where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects such that linear homopolymer polyethylene standard is obtained at 120,000 Mw.

The total plate count of the GPC column set was performed with decane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count}=5.54*(((RV\_(\text{Peak Max}))/(\text{Peak Width at}\tfrac{1}{2}\text{height}))^\wedge 2 \quad \text{(EQ 2)}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } [\![RV]\!]\_(\text{one tenth height}) - \|RV\|\_(\text{Peak max}))}{RV_{Peak\ max} - \text{Front Peak } RV_{one\ tenth\ height})} \quad \text{(EQ 3)}$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 18,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$MN_{(GPC)} = \frac{\sum^{i} IR_i}{\sum^{i} \left(IR_i / M_{polyethylene_i}\right)} \quad \text{(EQ 4)}$$

$$Mw_{(GPC)} = \frac{\sum^{i} \left(IR_i * M_{polyethylene_i}\right)}{\sum^{i} IR_i} \quad \text{(EQ 5)}$$

$$Mz_{(GPC)} = \frac{\sum^{i} \left(IR_i * M^2_{polyethylene_i}\right)}{\sum^{i} \left(IR_i * M_{polyethylene_i}\right)} \quad \text{(EQ 6)}$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−0.5% of the nominal flowrate.

$$\text{Flowrate(effective)} = \text{Flowrate(nominal)} * (RV(FM\ \text{Calibrated}) / RV(FM\ \text{Sample})) \quad \text{(EQ 7)}$$

Short chain branching per 1000 total carbon (SCB/1000C) is measured according to method described in the "Molecular Weighted Comonomer Distribution Index (MWCDI)" section of WO2015200743A1.

One or more features of the present disclosure are illustrated in view of the examples as follows:

EXAMPLES

Analysis of Hydrocarbyl-Modified Methylaluminoxanes

Example 1 is the analytical procedure for determination of aluminum concentration in a solution.

In a nitrogen atmosphere glovebox, aluminum-based analyte having the formula $A1R^{A1}R^{B1}R^{C1}$ was transferred to a tared bottle and the mass of the sample was recorded. The sample was diluted with methylcyclohexane and then quenched with methanol. The mixture was swirled and allowed to react over 15 minutes prior to removal of the sample from the glovebox. The sample was further hydrolyzed by addition of $H_2SO_4$. The bottle was capped shaken for five minutes. Periodic venting of the bottle may be necessary depending on aluminum concentration. The solution was transferred to a separatory funnel. The bottle was rinsed repeatedly with water adding each rinseate from this process to the separatory funnel. The organic layer was discarded and the remaining aqueous solution was transferred to a volumetric flask. The separatory funnel was further rinsed with water, each rinseate being added to the volumetric flask. The flask was diluted to a known volume, thoroughly mixed, and analyzed by complexation with excess EDTA and subsequent back-titration with ZnCl2 using xylenol orange as an indicator.

Calculation of the $A1R^{A1}R^{B1}R^{C1}$ Compound in the hydrocarbyl-modified methylaluminoxane.

$$\text{Molarity Al in titrant} = \frac{[(M\ EDTA * \text{mL}\ EDTA) - (M\ \text{ZnCl}_2 * \text{mL ZnCl}_2)]}{\text{mL, aqueous solution used in titrated}} \quad \text{(EQ. 8)}$$

$$\text{mole \% Al in sample} = \frac{\left((\text{Molarity Al in titrant} * \text{Volume of Volumetric Dilution}) * 26.98 \frac{\text{g}}{\text{mol Al}}\right)}{(\text{Mass of Analyte Sample})} * 100 \quad \text{(EQ. 9)}$$

The $A1R^{A1}R^{B1}R^{C1}$ Compound content is analyzed using previously described methods (Macromol. Chem. Phys. 1996, 197, 1537; WO2009029857A1; Analytical Chemistry 1968, 40 (14), 2150-2153; and Organometallics 2013, 32(11), 3354-3362)

Examples 1 to 3 are synthetic procedures for intermediates and for isolated co-catalysts.

The synthetic procedures for synthesizing metal-ligand complexes 1 to 12 may be found in in the procedures below and, where previously disclosed, in the following publications US20040010103A1, WO 2007136494A2, WO 2012027448A1, WO 2016003878A1, WO 2016014749A1, WO 2017058981A1, WO 2018022975A1, WO2012/027448 A1, WO 2018/022975 A1.

Metal-ligand complexes 1 to 15 and have a structure according to formula (I) and are as follows:

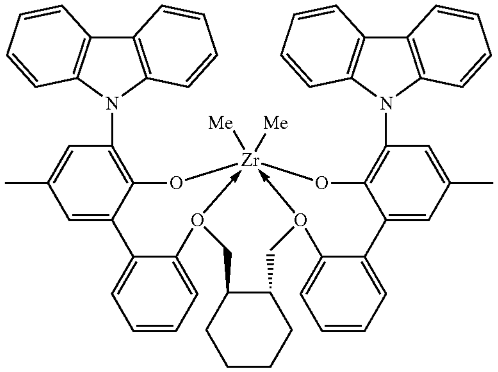

1

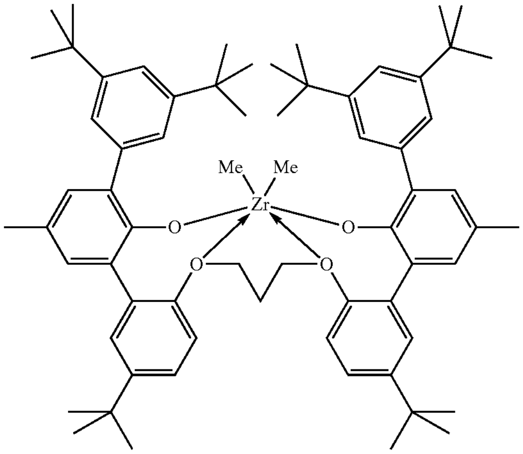

2

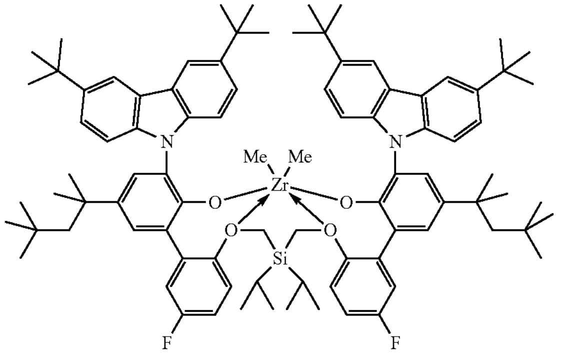

3

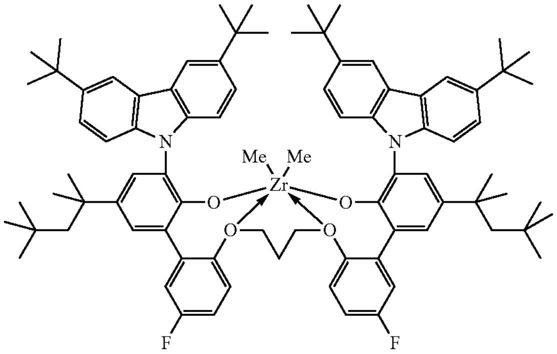

4

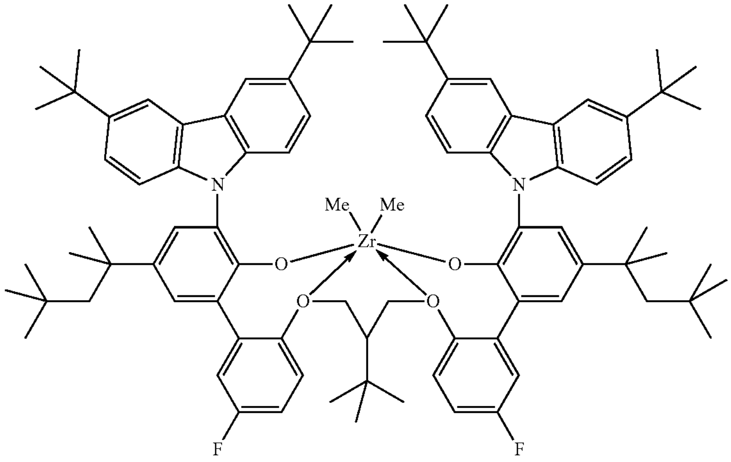

5

-continued
6
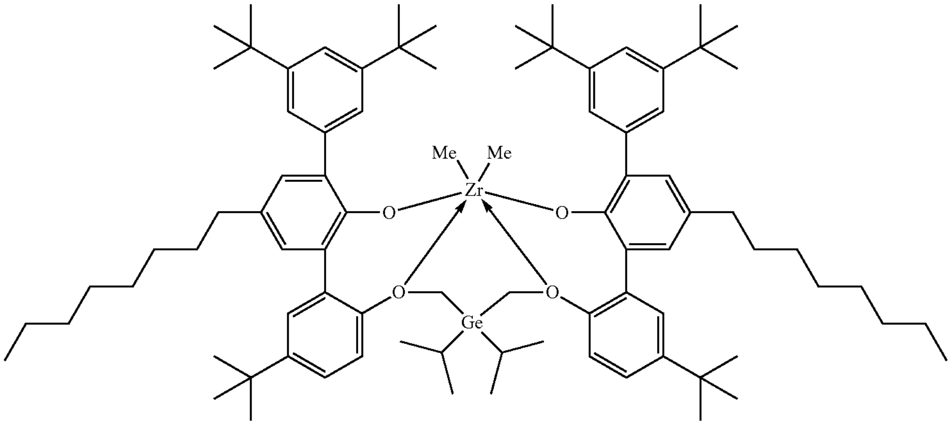
7
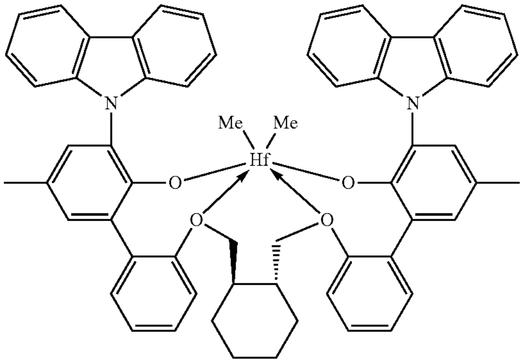
8
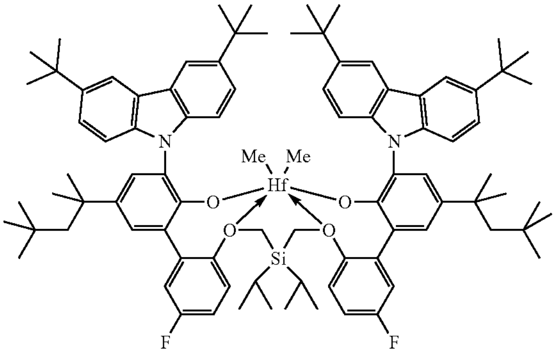
9
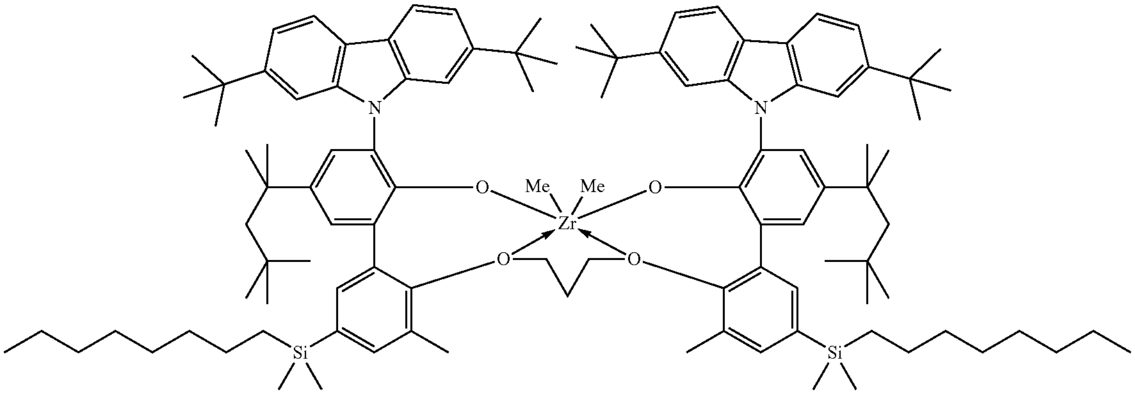
10
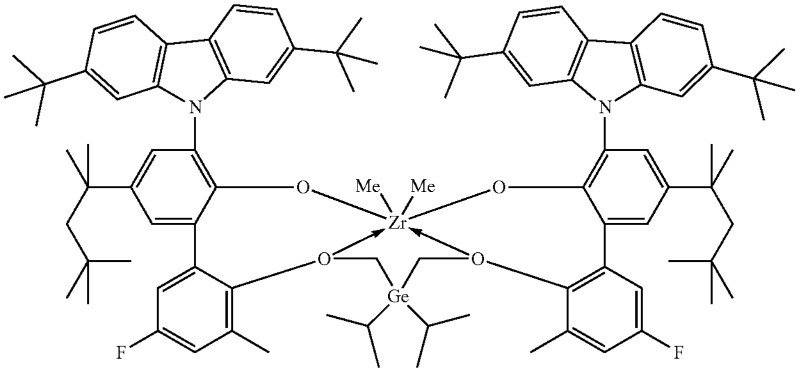

-continued
11
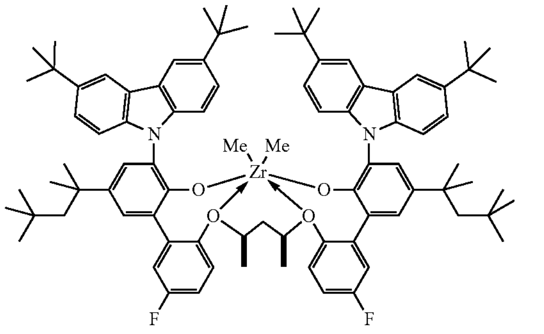
12
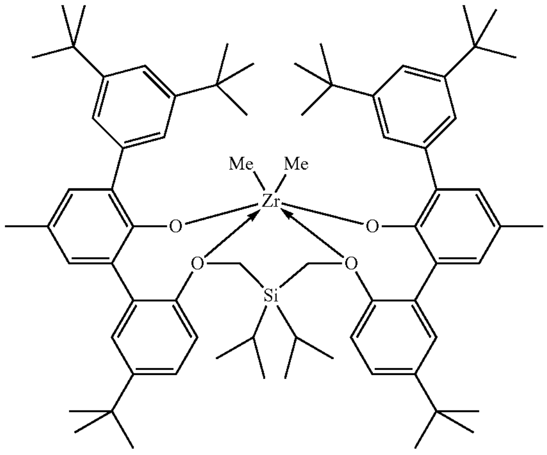
13
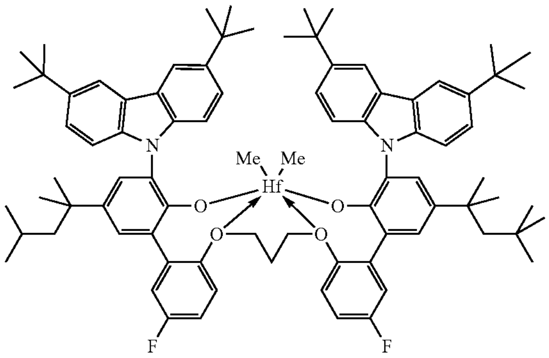
14
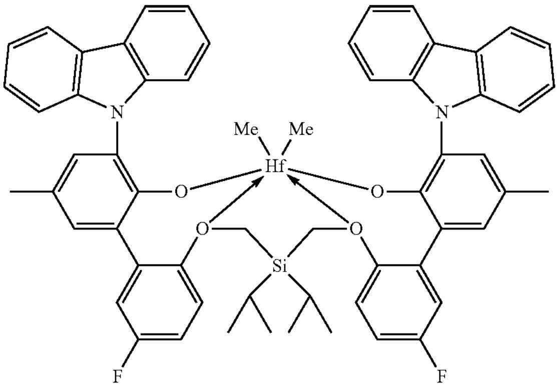
15
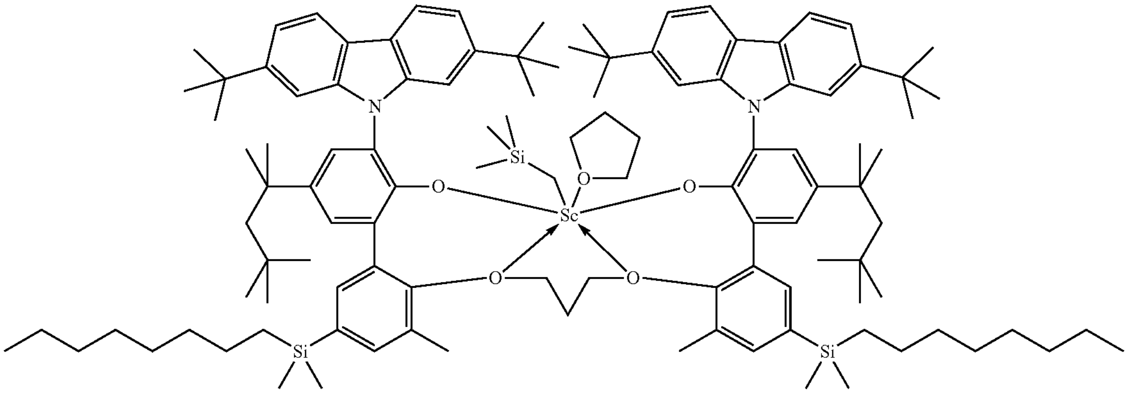

Preparation of BPP-3 (Ligand disclosed in WO2018022975 A1)

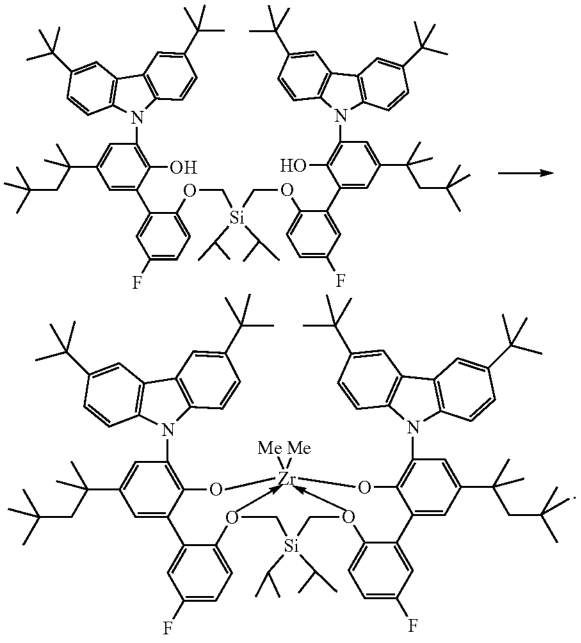

3

Synthesis of 6',6'''-(((diisopropylsilanediyl)bis(methylene))bis(oxy))bis(3-(3,6-di-tert-butyl-9H-carbazol-9-yl)-3'-fluoro-5-(2,4,4-trimethylpentan-2-yl)-[1,1'-biphenyl]-2-ol) dimethyl-zirconium (BPP-3): MeMgBr in diethyl ether (3.00 M, 5.33 mL, 16.0 mmol) was added to a −30° C. solution of $ZrCl_4$ (0.895 g, 3.84 mmol) in toluene (60 mL). After stirring for 3 minutes the solid ligand (5.00 g, 3.77 mmol) was added portionwise. The mixture was stirred for 8 h then the solvent was removed under reduced pressure overnight to afford a dark residue. Hexanes/toluene (10:1 70 mL) was added to the residue, the solution was shaken for a few minutes at room temperature, then this material was passed through a fritted funnel CELITE plug. The frit was extracted with hexanes (2×15 mL). The combined extracts were concentrated to dryness under reduced pressure. Pentane (20 mL) was added to the tan solid, the heterogeneous mixture was placed in the freezer (−35° C.) for 18 h. The brown pentane layer was removed using a pipet. The remaining material was dried under vacuum, which provided BPP-3 (4.50 g, yield: 83%) as a white powder:

$^1$H NMR (400 MHz, $C_6D_6$) δ 8.65-8.56 (m, 2H), 8.40 (dd, J=2.0, 0.7 Hz, 2H), 7.66-7.55 (m, 8H), 7.45 (d, J=1.9 Hz, 1H), 7.43 (d, J=1.9 Hz, 1H), 7.27 (d, J=2.5 Hz, 2H), 7.10 (d, J=3.2 Hz, 1H), 7.08 (d, J=3.1 Hz, 1H), 6.80 (ddd, J=9.0, 7.4, 3.2 Hz, 2H), 5.21 (dd, J=9.1, 4.7 Hz, 2H), 4.25 (d, J=13.9 Hz, 2H), 3.23 (d, J=14.0 Hz, 2H), 1.64-1.52 (m, 4H), 1.48 (s, 18H), 1.31 (s, 24H), 1.27 (s, 6H), 0.81 (s, 18H), 0.55 (t, J=7.3 Hz, 12H), 0.31 (hept, J=7.5 Hz, 2H), −0.84 (s, 6H); $^{19}$F NMR (376 MHz, $C_6D_6$) δ-116.71.

Synthesis of BPP-9

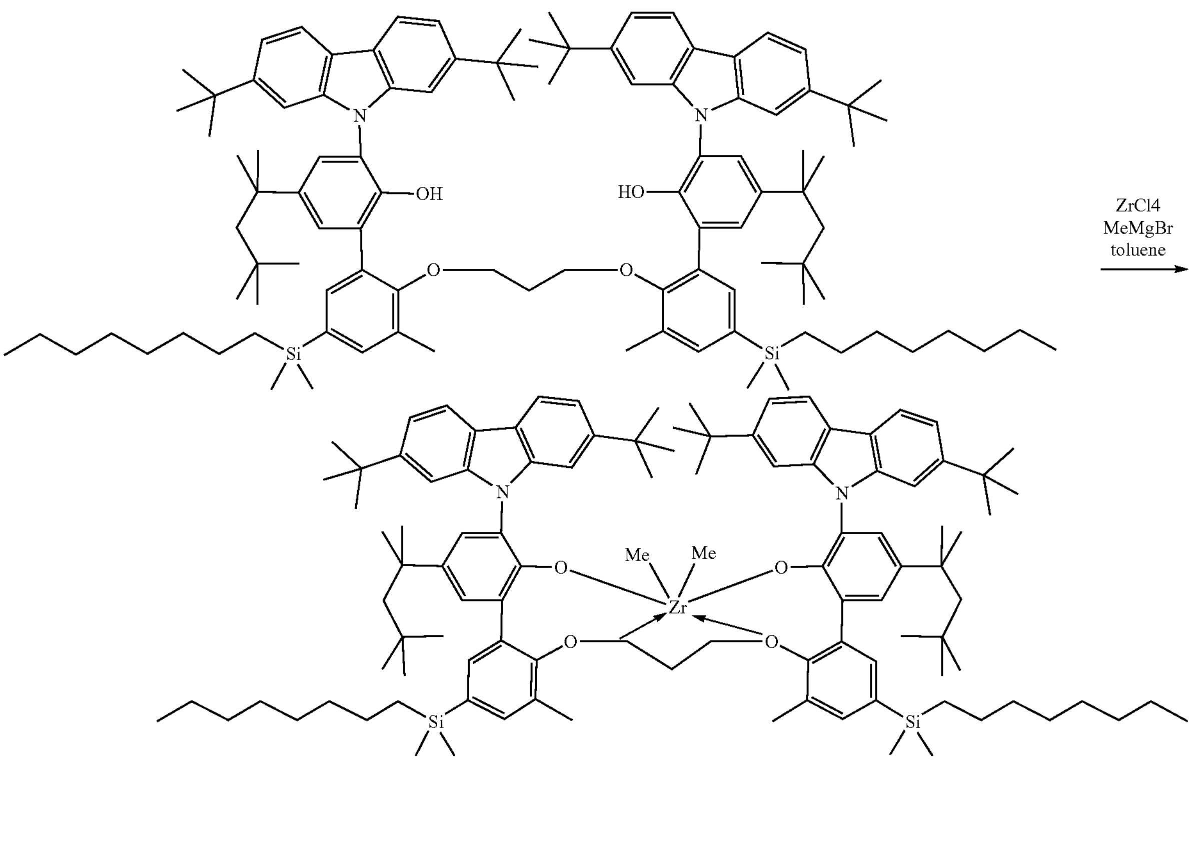

A 100 mL oven dried glass bottle was charged with $ZrCl_4$ (798 mg, 3.43 mmol), toluene (30 mL), and a stir bar. The solution was placed in the freezer and cooled to −30 C for 20 min. The solution was taken out of the freezer, and was treated with MeMgBr (4.35 mL, 13.1 mmol, 3 M in $Et_2O$) and stirred for 15 minutes. To the cold suspension, the BPP-9 ligand (5.00 g, 3.26 mmol) was added as a solid. The reaction was stirred at room temperature for 3 h, and then filtered through a fritted plastic funnel. The filtrate was dried under vacuum. The resulting solid was washed with hexanes, and dried under vacuum, providing BPP-9 as an off-white powder (3.31 g, 62%):

$^1H$ NMR (400 MHz, Benzene-$d_6$) δ 8.19 (d, J=8.2 Hz, 2H), 8.03-7.96 (m, 4H), 7.87 (d, J=2.5 Hz, 2H), 7.81-7.76 (m, 2H), 7.64 (d, J=2.5 Hz, 2H), 7.56 (d, J=1.7 Hz, 2H), 7.51 (dd, J=8.2, 1.7 Hz, 2H), 7.30 (dd, J=8.3, 1.7 Hz, 2H), 7.06-7.01 (m, 2H), 3.57 (dt, J=9.9, 4.9 Hz, 2H), 3.42 (dt, J=10.3, 5.2 Hz, 2H), 1.79 (d, J=14.5 Hz, 2H), 1.66 (d, J=14.4 Hz, 2H), 1.60 (s, 18H), 1.46 (s, 6H), 1.42 (s, 6H), 1.37-1.22 (m, 50H), 0.94-0.91 (m, 24H), 0.62-0.56 (m, 4H), 0.11 (s, 6H), 0.08 (s, 6H), −0.64 (s, 6H).

Preparation of BPP-10

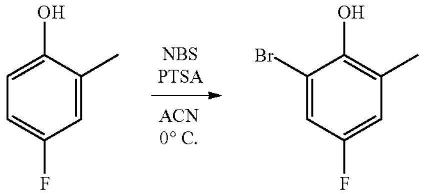

Synthesis of 2-bromo-4-fluoro-6-methyl-phenol: 1 L glass bottle was charged with acetonitrile (400 mL), 4-fluoro-6-methyl-phenol (50 g, 396.4 mmol), and p-toluenesulfonic acid (monohydrate) (75.6 g, 396 mmol), making sure everything was in solution. The solution was cooled to 0° C. with ice for 25 min (a precipitate formed). The cooled solution, was slowly treated with N-bromosuccinimide (70.55 g, 396.4 mmol) (over the course of approx. 5 min), and was allowed reach room temperature while stirring overnight. The reaction was analyzed by $^{19}F$ NMR spectroscopy and GC/MS to confirm complete conversion. The volatiles were removed under vacuum, and the resulting solid was treated with dichloromethane (600 mL), cooled in the freezer (0° C.), and filtered through a large plug of silica gel. The silica gel was washed several times with cold $CH_2Cl_2$. The volatiles were removed under vacuum (1" fraction yield: 46 g, 56%). $^1H$ NMR (400 MHz, Chloroform-d) δ 7.05 (ddd, J=7.7, 3.0, 0.7 Hz, 1H), 6.83 (ddt, J=8.7, 3.0, 0.8 Hz, 1H), 5.35 (s, 1H), 2.29 (d, J=0.7 Hz, 3H). $^{19}F$ NMR (376 MHz, Chloroform-d) 8-122.84.

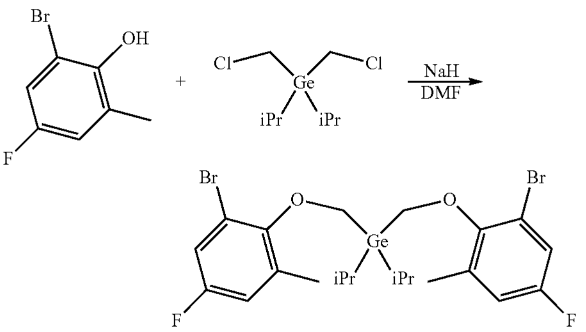

Synthesis of bis((2-bromo-4-fluoro-6-methylphenoxy)methyl)diisopropylgermane: In the glove box, in a 250 mL flask equipped with a magnetic stir bar, 95% NaH (1.76 g) (Caution $H_2$ is generated) was slowly added to a solution of 2-bromo-4-fluoro-6-methyl-phenol (15 g, 73.2 mmol) in N,N-dimethylformamide (DMF) (35 mL) until hydrogen evolution ceased. This mixture was stirred for 30 minutes at room temperature. After this time, the diisopropyl germyl dichloride (6.29 g, 24.4 mmol) was added. The mixture was warmed to 55° C. and held at this temperature for 18 h. The reaction was removed from the glove box and quenched with saturated aqueous $NH_4Cl$ (20 mL) and $H_2O$ (8 mL). $Et_2O$ (30 mL) was added and the phases were transferred to a separatory funnel and separated. The aqueous phase was further extracted with $Et_2O$ (20 mL), and the combined organic extracts were washed with brine (10 mL). The organic layer was then dried ($MgSO_4$), filtered, and concentrated to dryness. The crude residue was dry loaded onto silica gel and then purified using flash column chromatography (100 mL/min, pure hexanes with ethyl acetate ramping to 10% over 20 minutes) to afford a pale yellow oil as product. All clean fractions (some fractions contained <10% of starting phenol) were combined, and the final product was left under vacuum overnight (Yield: 9 g, 62%):

$^1H$ NMR (400 MHz, Chloroform-d) δ 7.10 (dd, J=7.7, 3.0 Hz, 2H), 6.84 (ddd, J=8.8, 3.1, 0.8 Hz, 2H), 4.14 (s, 4H), 2.33 (s, 6H), 1.74 (hept, J=7.4 Hz, 2H), 1.35 (d, J=7.4 Hz, 12H); $^{19}F$ NMR (376 MHz, Chloroform-d) δ-118.03.

Synthesis of BPP-10 ligand

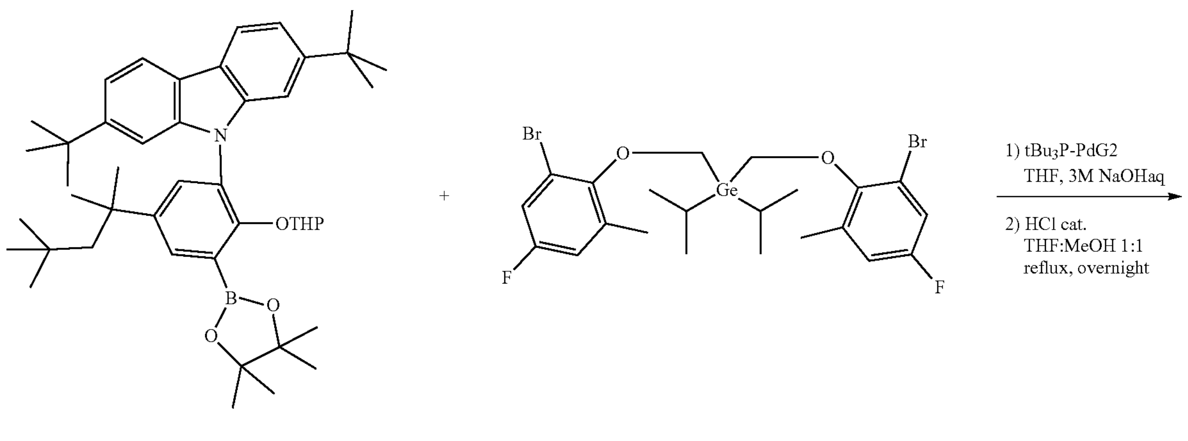

-continued

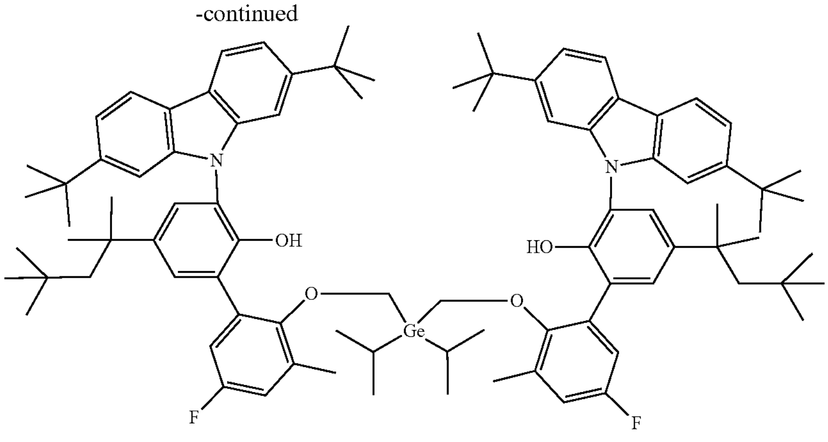

A 500 mL glass-bottle, equipped with a stir bar, was charged with 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (Disclosed in WO2014105411 A1) (29.0 g, 41.9 mmol), bis((2-bromo-4-fluoro-6-methylphenoxy)methyl) diisopropylgermane (6.00 g, 8.65 mmol, contains 10% 2-bromo-4-fluoro-2-methyl-phenol), and THF (80 mL). The solution was heated to 55° C. and, while stirring, was treated with chloro[(tri-tert-butylphosphine)-2-(2-aminobiphenyl)] palladium(II) ($tBu_3P$—PdG2) (199 mg, 0.346 mmol, 4 mol %). An aqueous solution of NaOH (17.3 mL, 51.9 mmol, 3M) was purged with nitrogen for 20 min, and then added to the THF solution. The reaction was stirred overnight at 55° C. The aqueous phase was separated and discarded, and the remaining organic phase was diluted with diethyl ether and washed with brine twice. The solution was passed through a short plug of silica gel. The filtrate was dried on a rotary evaporator, dissolved in THF/methanol (40 mL/40 mL), treated with HCl (2 mL), and stirred overnight at 70° C. The solution was dried under vacuum, and purified by C18 reverse-phase column chromatography to provide the BPP-10 ligand as an off-white solid (Yield: 6.5 g, 54%):

$^1$H NMR (400 MHz, Chloroform-d) δ 8.01 (d, J=8.2 Hz, 4H), 7.42 (dd, J=25.5, 2.4 Hz, 4H), 7.32 (dd, J=8.2, 1.6 Hz, 4H), 7.17 (s, 4H), 6.87 (ddd, J=16.4, 8.8, 3.0 Hz, 4H), 6.18 (s, 2H), 3.79 (s, 4H), 2.12 (s, 6H), 1.71 (s, 6H), 1.56 (s, 4H), 1.38 (s, 12H), 1.31 (s, 36H), 0.83-0.73 (m, 30H); $^{19}$F NMR (376 MHz, Chloroform-d) δ-119.02.

Synthesis of BPP-10

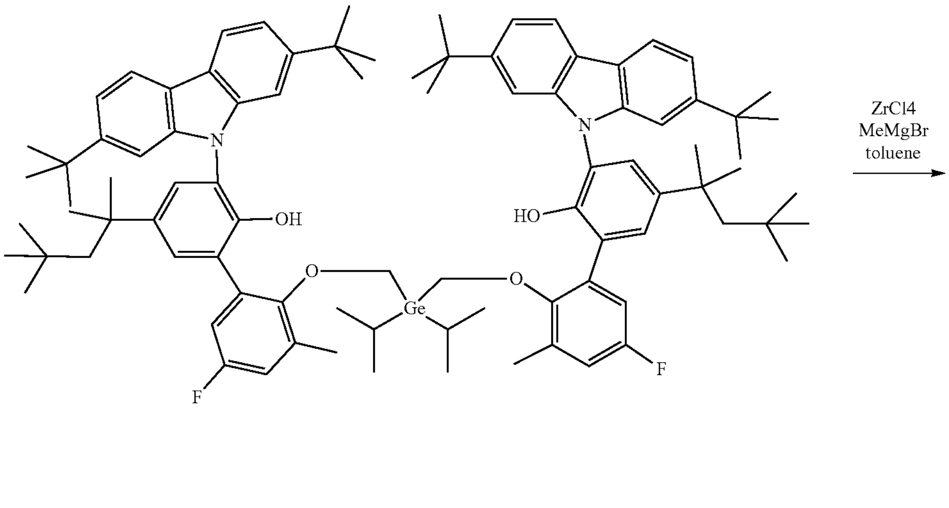

-continued

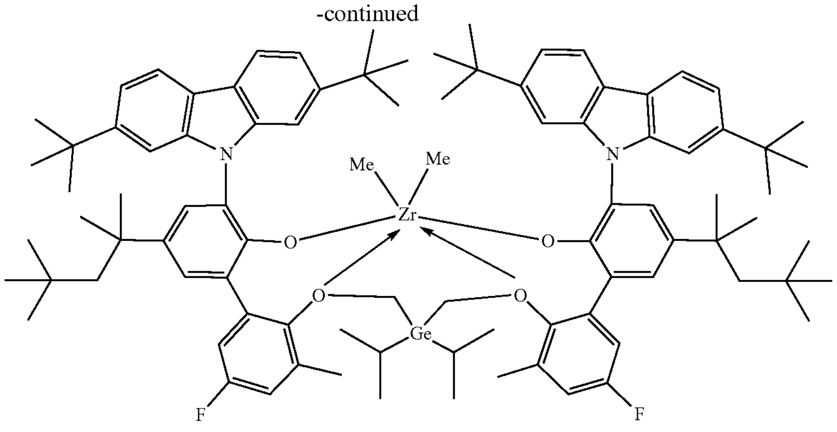

A 100 mL oven dried glass bottle was charged with $ZrCl_4$ (402 mg, 1.72 mmol), toluene (83 mL), and a stir bar. The solution was placed in the freezer and cooled to −30 C for 20 min. The solution was taken out of the freezer, and was treated with MeMgBr (2.4 mL, 7.1 mmol, 3 M in $Et_2O$) and stirred for 3 minutes. To the cold suspension, the BPP-10 ligand (2.3 g, 1.64 mmol) was added as a solid, and the residual powder was dissolved in cold toluene (3 mL) and added to the reaction. The reaction was stirred overnight at room temperature, and then filtered through a fritted plastic funnel. The filtrate was dried under vacuum, redissolved in toluene (40 mL), filtered again through a plug of CELITE, and dried again under vacuum. The resulting solid was washed with pentane (approx. 5 mL) and dried under vacuum, providing BPP-10 as an off-white powder (2.1 g, 84%):

$^1H$ NMR (400 MHz, Benzene-$d_6$) δ 8.20 (dd, J=8.2, 0.5 Hz, 2H), 8.11 (dd, J=8.2, 0.6 Hz, 2H), 7.88-7.82 (m, 4H), 7.77 (d, J=2.6 Hz, 2H), 7.50 (dd, J=8.3, 1.7 Hz, 2H), 7.42-7.37 (m, 4H), 6.99 (dd, J=8.7, 3.1 Hz, 2H), 6.20-6.10 (m, 2H), 4.29 (d, J=12.2 Hz, 2H), 3.90 (d, J=12.2 Hz, 2H), 1.56 (s, 4H), 1.53 (s, 18H), 1.29 (s, 24H), 1.27 (s, 6H), 1.18 (s, 6H), 1.04-0.94 (m, 2H), 0.81 (d, J=7.4 Hz, 6H), 0.80 (s, 18H), 0.74 (d, J=7.4 Hz, 6H), −0.47 (s, 6H); $^{19}F$ NMR (376 MHz, Benzene-$d_6$) δ-116.24.

Synthesis of BPP-12

Preparation of bis((2-bromo-4-tbutylphenoxy)methyl)diisopropylsilane

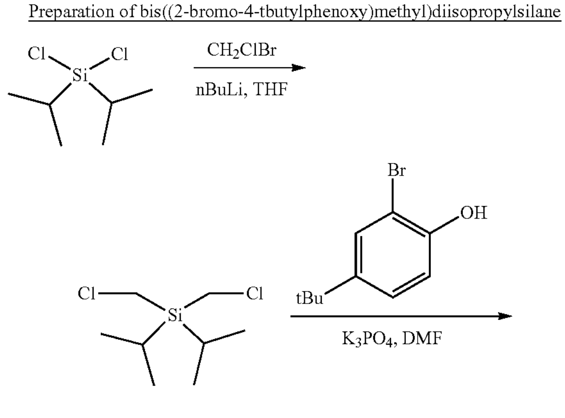

-continued

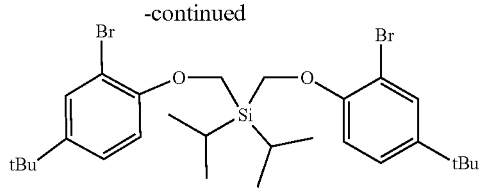

In a glovebox, diisopropyldichlorosilane (3.703 g, 20 mmol, 1.0 equiv) was dissolved in anhydrous THF (120 mL) in a 250 mL single-neck round-bottom flask. The flask was capped with a septum, sealed, taken out of glovebox, and cooled to −78° C. in a dry ice-acetone bath. Bromochloromethane (3.9 mL, 60 mmol, 3.0 equiv) was added. A solution of n-BuLi (18.4 mL, 46 mmol, 2.3 equiv) in hexane was added to the cooled wall of the flask over a period of 3 h using a syringe pump. The mixture was allowed to warm up to room temperature overnight (16 h) and saturated $NH_4Cl$ (30 mL) was added. The two layers were separated. The aqueous layer was extracted with ether (2×50 mL). The combined organic layer was dried over $MgSO_4$, filtered and concentrated under reduced pressure. The crude product was used for the next step without further purification.

In a glove box, a 40 mL vial was charged with bis(chloromethyl)diisopropylsilane (2.14 g, 10 mmol, 1.0 equiv), 4-t-butyl-2-bromophenol (6.21 g, 27 mmol, 2.7 equiv), $K_3PO_4$ (7.46 g, 35 mmol, 3.5 equiv), and DMF (10 mL). The reaction mixture was stirred at 80° C. overnight. After cooling down to room temperature, the reaction mixture was purified by column chromatography using ether/hexane (0/100->30/70) as the eluent. Collected 4.4 g of a colorless oil, 73% overall yield after 2 steps.

$^1H$ NMR (400 MHz, $CDCl_3$) δ 7.51 (d, J=2.4 Hz, 2H), 7.26 (dd, J=8.6, 2.4 Hz, 2H), 6.98 (d, J=8.6 Hz, 2H), 3.93 (s, 4H), 1.45-1.33 (m, 2H), 1.28 (s, 18H), 1.20 (d, J=7.3 Hz, 12H).

Preparation of 6'', 6''''-(((diisopropylsilanediyl)bis(methylene))bis(oxy))bis(3, 3'', 5-tri-tert-butyl-5'-methyl-[1, 1':3', 1''-terphenyl]-2'-ol)

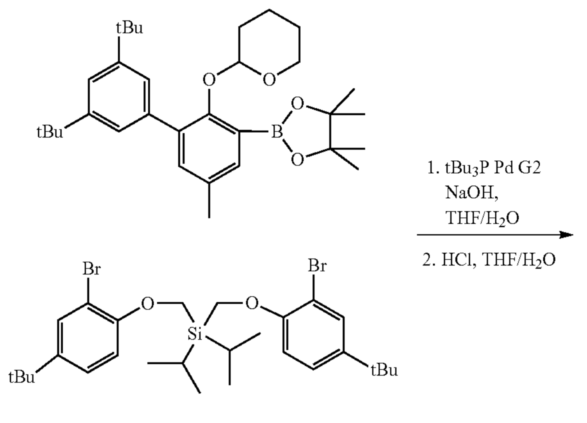

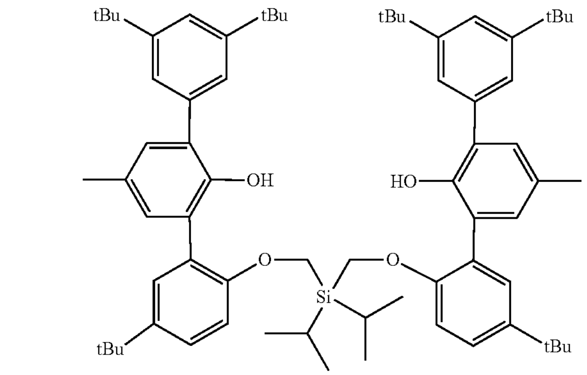

In a glove box, a 40 mL vial equipped with a stir bar was charged with bis((2-bromo-4-t-butylphenoxy)methyl)diisopropylsilane (1.20 g, 2.0 mmol, 1.0 equiv), 2-(3',5'-di-tert-butyl-5-methyl-2-((tetrahydro-2H-pyran-2-yl)oxy)-[1,1'-biphenyl]-3-yl)-4,4,5,5-tetramethyl-1,3,2-dioxaborolane (2.54 g, 5.0 mmol, 2.5 equiv), $tBu_3P$ Pd G2 (0.031 g, 0.06 mmol, 0.03 equiv), THF (3 mL), and NaOH 4 M solution (3.0 mL, 12.0 mmol, 6.0 equiv). The vial was heated under nitrogen at 55° C. for 2 hours. When completed, the top organic layer was extracted with ether and filtered through a short plug of silica gel. Solvents were removed under reduced pressure. The residue was dissolved in THF (10 mL) and MeOH (10 mL). Concentrated HCl (0.5 mL) was then added. The resulting mixture was heated at 75° C. for 2 hours then cooled to room temperature. Solvents were removed under reduced pressure. The residue was purified by reverse phase column chromatography using THF/MeCN (0/100->100/0) as the eluent. Collected 1.62 g of a white solid, 78% yield.

$^1H$ NMR (400 MHz, $CDCl_3$) δ 7.39 (t, J=1.8 Hz, 2H), 7.36 (d, J=1.8 Hz, 4H), 7.29 (d, J=2.5 Hz, 2H), 7.22 (dd, J=8.6, 2.6 Hz, 2H), 7.10 (d, J=2.2 Hz, 2H), 6.94 (d, J=2.3, 2H), 6.75 (d, J=8.6 Hz, 2H), 5.37 (s, 2H), 3.61 (s, 4H), 2.32 (d, J=0.9 Hz, 6H), 1.33 (s, 36H), 1.29 (s, 18H), 0.90-0.81 (m, 2H), 0.73 (d, J=7.1 Hz, 12H).

Preparation of BPP-12

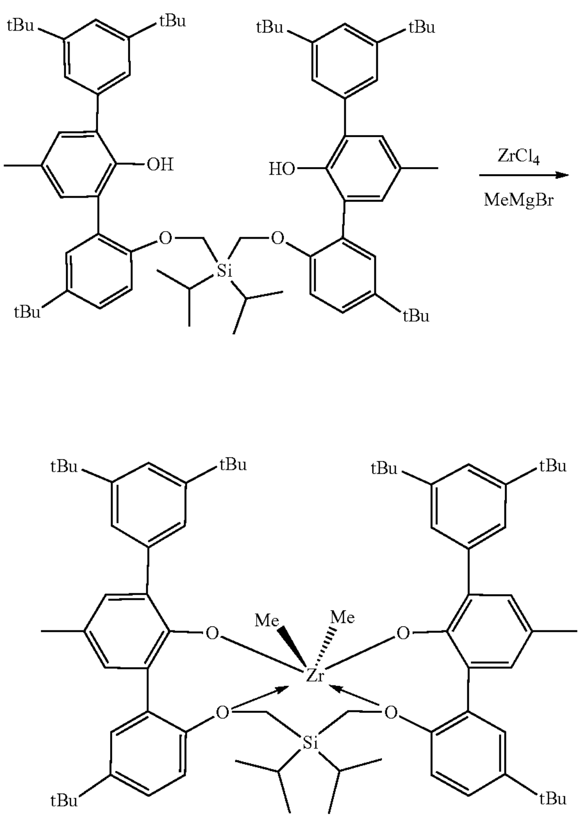

In a glovebox, an oven dried 40 mL vial with a stir bar was charged with $ZrCl_4$ (47 mg, 0.2 mmol, 1.0 equiv) and anhydrous toluene (6.0 mL). The vial was cooled to −30° C. in freezer for at least 30 minutes. The vial was taken out of freezer. MeMgBr (3 M, 0.29 mL, 0.86 mmol, 4.3 equiv) was added to the stirring suspension. After 2 minutes, 6'',6''''-(((diisopropylsilanediyl)bis(methylene))bis(oxy))bis(3,3'',5-tri-tert-butyl-5'-methyl-[1,1':3',1''-terphenyl]-2'-ol) (206 mg, 0.2 mmol, 1.0 equiv) was added as solid. The resulting mixture was stirred at room temperature overnight. Solvents were removed under vacuum to yield a dark solid which was washed with hexanes (10 mL) then extracted with toluene (12 mL). After filtering, the toluene extract was dried under vacuum. Collected 170 mg of a white solid, 74% yield.

$^1H$ NMR (400 MHz, $C_6D_6$) δ 8.20-7.67 (m, 4H), 7.79 (t, J=1.8 Hz, 2H), 7.56 (d, J=2.5 Hz, 2H), 7.26 (d, J=2.4, 2H), 7.21 (d, J=2.4, 2H), 7.18 (d, J=2.4, 2H), 5.67 (d, J=8.6 Hz, 2H), 4.61 (d, J=13.5 Hz, 2H), 3.46 (d, J=13.5 Hz, 2H), 2.26 (s, 6H), 1.47 (s, 36H), 1.25 (s, 18H), 0.52 (dd, J=17.0, 7.5 Hz, 12H), 0.30-0.18 (m, 2H), −0.05 (s, 6H).

Preparation of BPP-15

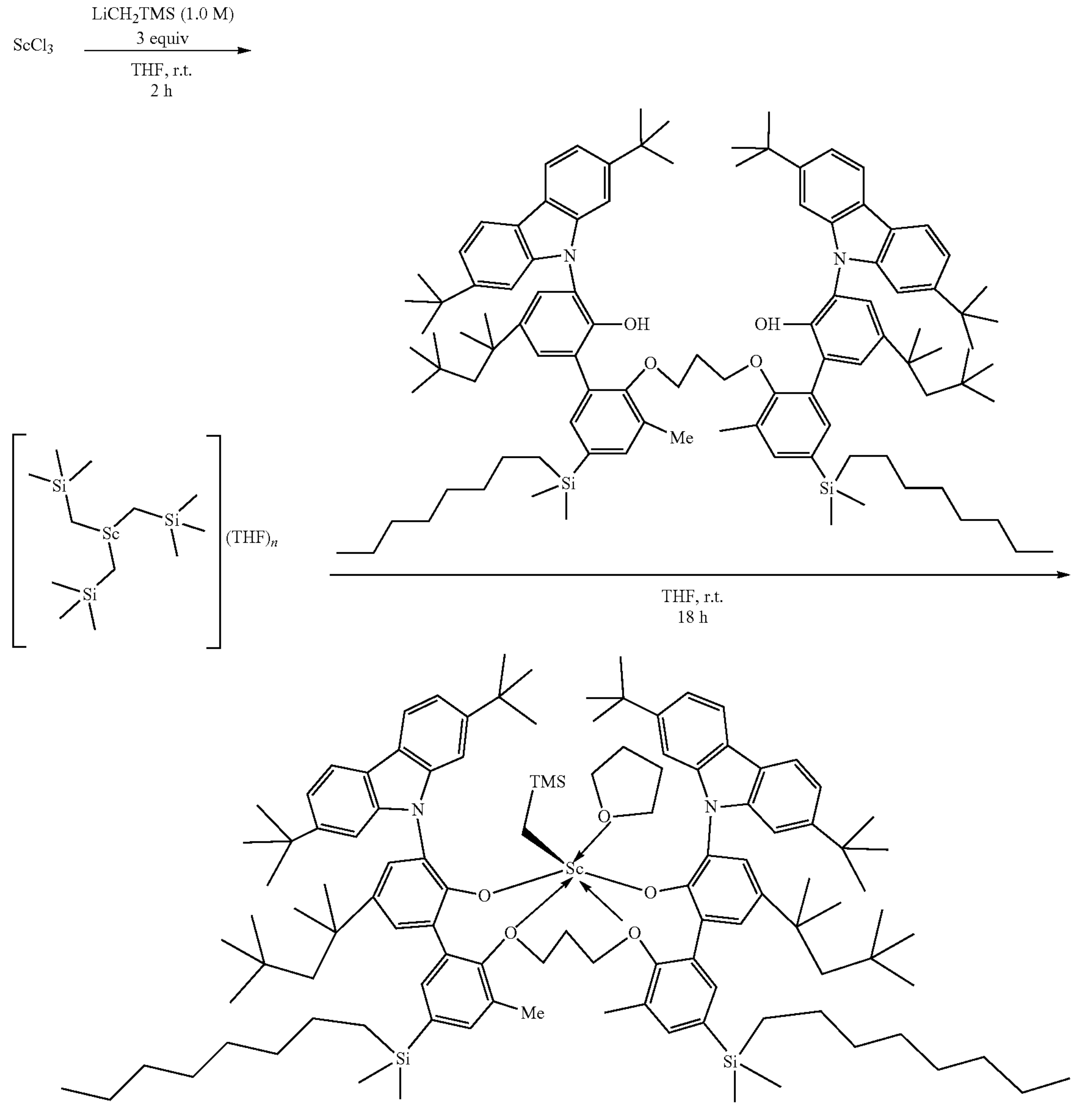

15

In a nitrogen glove box, an oven-dried vial was charged with $ScCl_3$ (0.016 g, 0.106 mmol), THF (ca. 50 mL), and a magnetic stir bar. The mixture was cooled at −30° C. and then $LiCH_2TMS$ (1.0 M in pentane, 0.35 mL, 0.35 mmol) was added dropwise and then the mixture was stirred at room temperature for 1.5 h. To this mixture, 1 equiv of ligand formula i (0.168 g, 0.106 mmol) in THF (ca. 10 mL) was slowly added and the reaction mixture was allowed to be stirred at room temperature for 18 h. Solvent was then removed in vacuo to afford BPP-19 as a white solid (0.154 g, 83%).

Preparation of ligand detailed in WO2017058981 A1.

Example 1—Batch Reactor Polymerization Reactions with metal-ligand complexes 7, 8, 12, 13, 14, a borate activator, and hydrocarbyl-modified methylaluminoxanes having less than 25 mole percent $A1R^{A1}R^{B1}R^{C1}$ based on the total moles of aluminum.

Metal-ligand complexes 7, 8, 12, 13, 14 were tested in the batch reactor using MMAO-A1 or MMAO-A2 or MMAO-compl along with the borate activator, and the data are summarized in Tables 1-6. The dry weight efficiencies are higher when the catalyst was activated with the borate in the presence of MMAO-A1 or MMAO-A2 as opposed to MMAO-compl.

TABLE 1

Batch reactor polymerization data of BPP-8

| Scavenger | Aluminum $AlR^{A1}R^{B1}R^{C1}$ (%) | Al:Hf ratio | Eff (MM) | $T_m$ (° C.) | Mn (g/mol) | MWD | Mw (g/mol) |
|---|---|---|---|---|---|---|---|
| MMAO-Compl | 29 | 50 | 0.68 | 87.0 | 369,861 | 2.60 | 960,274 |

TABLE 1-continued

Batch reactor polymerization data of BPP-8

| Scavenger | Aluminum $AlR^{A1}R^{B1}R^{C1}$ (%) | Al:Hf ratio | Eff (MM) | $T_m$ (° C.) | Mn (g/mol) | MWD | Mw (g/mol) |
|---|---|---|---|---|---|---|---|
| MMAO-Comp1 | 29 | 100 | 0.41 | 87.3 | 370,577 | 2.38 | 883,304 |
| MMAO-Comp1 | 29 | 150 | 0.38 | 86.5 | 360,356 | 2.45 | 884,352 |
| MMAO-A1 | 15 | 50 | 1.04 | 88.3 | 365,490 | 2.45 | 896,188 |
| MMAO-A1 | 15 | 100 | 0.78 | 87.3 | 197,844 | 3.34 | 660,018 |
| MMAO-A1 | 15 | 150 | 1.37 | 89.2 | 177,694 | 3.92 | 696,516 |

Polymerization conditions: 1.47 kg ISOPAR E; 100 g 1-octene; 100 g ethylene; total pressure=410 psi at 160° C.; metal-ligand complex:activator=1:1.2; activator=$[HNMe(C_{18}H_{37})_2][B(C_6F_5)_4]$; reaction time=10 min.

TABLE 2

Batch reactor polymerization data of BPP-7

| Scavenger | Aluminum $AlR^{A1}R^{B1}R^{C1}$ (%) | Al:Hf ratio | Eff (MM) | SCB/1000 C | Mn (g/mol) | MWD | Mw (g/mol) |
|---|---|---|---|---|---|---|---|
| MMAO-Comp1 | 29 | 50 | 0.7 | 21.6 | 175,058 | 2.19 | 382,551 |
| MMAO-Comp1 | 29 | 100 | 0.58 | 21.1 | 181,358 | 2.20 | 398,600 |
| MMAO-Comp1 | 29 | 150 | 0.39 | 21.5 | 180,576 | 2.18 | 394,264 |
| MMAO-A2 | 11 | 50 | 0.70 | 21.6 | 178,422 | 2.23 | 397,405 |
| MMAO-A2 | 11 | 100 | 0.75 | 21.5 | 176,191 | 2.27 | 399,141 |
| MMAO-A2 | 11 | 150 | 1.44 | 20.7 | 174,446 | 2.35 | 409,984 |

Polymerization conditions: 1.25 kg ISOPAR E; 60 g 1-octene; 100 g ethylene; 40 mmol $H_2$, total pressure=320 psi at 160° C.; metal-ligand complex:activator=1:1.2; activator=$[HNMe(C_{18}H_{37})_2][B(C_6F_5)_4]$; reaction time=10 min.

TABLE 3

Batch reactor polymerization data of BPP-13

| Scavenger | Aluminum $AlR^{A1}R^{B1}R^{C1}$ (%) | Al:Hf ratio | Eff (MM) | SCB/1000 C | Mn (g/mol) | MWD | Mw (g/mol) |
|---|---|---|---|---|---|---|---|
| MMAO-Comp1 | 29 | 50 | 0.66 | 17.1 | 200,796 | 1.99 | 398,960 |
| MMAO-Comp1 | 29 | 100 | 0.23 | 19.5 | 173,111 | 1.84 | 318,472 |
| MMAO-Comp1 | 29 | 150 | 0.22 | 19.7 | 173,591 | 1.82 | 315,524 |
| MMAO-A2 | 11 | 50 | 0.97 | 19.0 | 175,107 | 1.88 | 329,587 |
| MMAO-A2 | 11 | 100 | 1.10 | 19.3 | 171,724 | 1.97 | 338,712 |
| MMAO-A2 | 11 | 150 | 0.86 | 19.0 | 177,022 | 1.87 | 330,436 |

Polymerization conditions: 1.25 kg ISOPAR E; 60 g 1-octene; 100 g ethylene; 40 mmol $H_2$, total pressure=320 psi at 160° C.; metal-ligand complex:activator=1:1.2; activator=$[HNMe(C_{18}H_{37})_2][B(C_6F_5)_4]$; reaction time=10 min.

TABLE 4

Batch reactor polymerization data of BPP-14

| Scavenger | Aluminum $AlR^{A1}R^{B1}R^{C1}$ (%) | Al:Hf ratio | Eff (MM) | $T_m$ (° C.) | Mn (g/mol) | MWD | Mw (g/mol) |
|---|---|---|---|---|---|---|---|
| MMAO-Comp1 | 29 | 50 | 0.62 | 85.7 | 143,423 | 2.07 | 297,049 |
| MMAO-Comp1 | 29 | 100 | 0.68 | 86.0 | 143,326 | 2.08 | 298,362 |
| MMAO-Comp1 | 29 | 150 | 0.92 | 85.1 | 154,669 | 1.91 | 295,355 |
| MMAO-A2 | 11 | 50 | 0.54 | 85.1 | 140,718 | 2.02 | 283,520 |
| MMAO-A2 | 11 | 100 | 0.95 | 85.3 | 145,011 | 2.10 | 304,045 |
| MMAO-A2 | 11 | 150 | 1.08 | 85.3 | 144,169 | 2.09 | 300,638 |

Polymerization conditions: 1.25 kg ISOPAR E; 60 g 1-octene; 100 g ethylene; 40 mmol $H_2$, total pressure=320 psi at 160° C.; metal-ligand complex:activator=1:1.2; activator=$[HNMe(C_{18}H_{37})_2][B(C_6F_5)_4]$; reaction time=10 min.

TABLE 5

Batch reactor polymerization data of BPP-12

| Scavenger | Aluminum $AlR^{A1}R^{B1}R^{C1}$ (%) | Al:Hf ratio | Eff (MM) | SCB/1000 | Mn (g/mol) | MWD | Mw (g/mol) |
|---|---|---|---|---|---|---|---|
| MMAO-Comp1 | 29 | 50 | 1.11 | 12.7 | 128,945 | 2.00 | 257,873 |
| MMAO-Comp1 | 29 | 100 | 0.81 | 13.1 | 128,101 | 2.00 | 256,003 |
| MMAO-Comp1 | 29 | 150 | 1.17 | 12.8 | 147,495 | 1.78 | 261,792 |
| MMAO-A2 | 11 | 50 | 0.85 | 13.0 | 147,098 | 1.76 | 258,953 |
| MMAO-A2 | 11 | 100 | 1.07 | 12.9 | 120,759 | 1.99 | 240,278 |
| MMAO-A2 | 11 | 150 | 1.33 | 13.1 | 120,352 | 1.99 | 239,162 |

Polymerization conditions: 1.25 kg ISOPAR E; 60 g 1-octene; 100 g ethylene; 40 mmol $H_2$, total pressure=320 psi at 160° C.; metal-ligand complex:activator=1:1.2; activator=$[HNMe(C_{18}H_{37})_2][B(C_6F_5)_4]$; reaction time=10 min.

Example 2—Continuous Process Polymerization Reaction Data with BPP-8, a borate activator, and hydrocarbyl modified methylaluminoxanes having less than 25 mole percent $A1R^{A1}R^{B1}R^{C1}$ based on the total moles of aluminum.

TABLE 6

| Continuous process polymerization data for BPP-8 | | | | | | | | | | |
|---|---|---|---|---|---|---|---|---|---|---|
| Cat | MMAO | Aluminum $AlR^{A1}R^{B1}R^{C1}$ (%) | Al:Hf ratio | Eff.[C] | Solids (%)[A] | $H_2$ mol %[B] | $C_2$ conv. (%) | $I_2$ (g/10 min) | $I_{10}/I_2$ | Density (g/cc) |
| 8 | MMAO-comp2 | 41 | 18.6 | 2.36 | 27.9 | 0.87 | 93.1 | 12.9 | 6.49 | 0.8743 |
| 8 | MMAO-A1 | 15 | 18.6 | 6.00 | 28.1 | 0.77 | 93.3 | 13.9 | 6.49 | 0.8734 |

Polymerization conditions: 175° C., feed flows of 191 lbs/h ethylene, 69 lbs/h of 1-octene, 648 lbs/h of ISOPAR E, 650 psi, metal-ligand complex:activator=1:1.0; activator=$[HNMe(C_{18}H_{37})_2][B(C_6F_5)_4]$; [A]% Solids is the concentration of polymer in the reactor. [B]$H_2$ (mol %) is defined as the mole fraction of hydrogen, relative to ethylene, fed into the reactor. [C]The efficiency (Eff.) is measured as $10^6$ g polymer/g metal).

Equipment Standards

All solvents and reagents are obtained from commercial sources and used as received unless otherwise noted. Anhydrous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Varian 400-MR and VNMRS-500 spectrometers. LC-MS analyses are performed using a Waters e2695 Separations Module coupled with a Waters 2424 ELS detector, a Waters 2998 PDA detector, and a Waters 3100 ESI mass detector. LC-MS separations are performed on an XBridge C18 3.5 μm 2.1×50 mm column using a 5:95 to 100:0 acetonitrile to water gradient with 0.10% formic acid as the ionizing agent. HRMS analyses are performed using an Agilent 1290 Infinity LC with a Zorbax Eclipse Plus $C_{18}$ $_{1.8}$ μm 2.1×50 mm column coupled with an Agilent 6230 TOF Mass Spectrometer with electrospray ionization. $^1H$ NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1H$ NMR data are reported in ppm downfield from internal tetramethylsilane (TMS, δ scale) using residual protons in the deuterated solvent as references. $^{13}C$ NMR data are determined with $^1H$ decoupling, and the chemical shifts are reported downfield from tetramethylsilane (TMS, δ scale) in ppm versus the using residual carbons in the deuterated solvent as references.

The invention claimed is:

1. A process of polymerizing olefin monomers, the process comprising reacting ethylene and optionally one or more olefin monomers in the presence of a catalyst system, wherein the catalyst system comprises: an activator; hydrocarbyl-modified methylaluminoxane having less than 25 mole percent trialkyl aluminum based on the total moles of aluminum, wherein trialkyl aluminum has a formula of $AlR^{A1}R^{B1}R^{C1}$, wherein $R^{A1}$, $R^{B1}$, and $R^{C1}$ are independently linear $(C_1\text{-}C_{40})$alkyl, branched $(C_1\text{-}C_{40})$alkyl, or $(C_1\text{-}C_{40})$aryl; and one or more metal-ligand complexes comprising a metal-ligand complex according to formula (I):

(I)

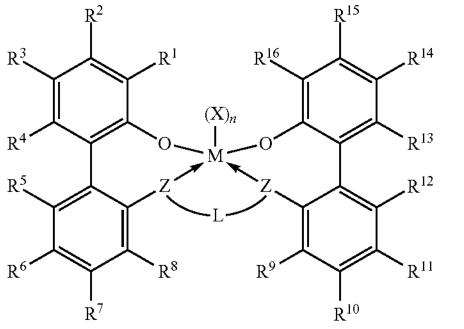

wherein:

M is titanium, zirconium, hafnium, scandium, yttrium, or an element of the lanthanide series of the periodic table;

n is 1,2, or 3;

each X is a monodentate ligand independently chosen from unsaturated $(C_2\text{-}C_{50})$hydrocarbon, unsaturated $(C_2\text{-}C_{50})$heterohydrocarbon, $(C_1\text{-}C_{50})$hydrocarbyl, $(C_6\text{-}C_{50})$aryl, $(C_6\text{-}C_{50})$heteroaryl, cyclopentadienyl, substituted cyclopentadienyl, $(C_4\text{-}C_{12})$diene, halogen, $—N(R^N)_2$, and $—N(R^N)COR^C$, optionally, two X may be linked together;

the metal-ligand complex is overall charge-neutral;

each Z is independently chosen from —O—, —S—, $—N(R^N)—$, or $—P(R^P)—$;

$R^1$ and $R^{16}$ are independently selected from the group consisting of —H, $(C_1\text{-}C_{40})$hydrocarbyl, $(C_1\text{-}C_{40})$heterohydrocarbyl, $—Si(R^C)_3$, $—Ge(R^C)_3$, $P(R^P)_2$, $—N(R^N)_2$, $—OR^C$, $—SR^C$, $—NO_2$, —CN, $—CF_3$, $R^CS(O)—$, $R^CS(O)_2—$, $—N{=}C(R^C)_2$, $R^CC(O)O—$, $R^COC(O)—$, $R^CC(O)N(R^N)—$, $(R^C)_2NC(O)—$, halogen, radicals having formula (II), radicals having formula (III), and radicals having formula (IV):

(II)

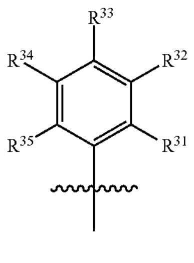

-continued (III)

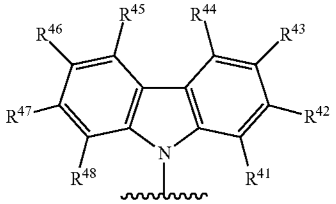

(IV)

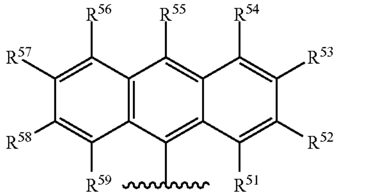

wherein each of $R^{31-35}$, $R^{41-48}$, and $R^{51-59}$ is independently chosen from —H, $(C_1-C_{40})$hydrocarbyl, $(C_1-C_{40})$heterohydrocarbyl, $—Si(R^C)_3$, $—Ge(R^C)_3$, $—P(R^P)_2$, $—N(R^N)_2$, $—OR^C$, $—SR^C$, $—NO_2$, —CN, $—CF_3$, $R^CS(O)—$, $R^CS(O)_2—$, $(R^C)_2C{=}N—$, $R^CC(O)O—$, $R^COC(O)—$, $R^CC(O)N(R^N)—$, $(R^C)_2NC(O)—$, or halogen;

$R^2$, $R^3$, $R^4$, $R^5$, $R^6$, $R^7$, $R^8$, $R^9$, $R^{10}$, $R^{11}$, $R^{12}$, $R^{13}$, $R^{14}$, and $R^{15}$ are independently selected from —H, $(C_1-C_{40})$hydrocarbyl, $(C_1-C_{40})$heterohydrocarbyl, $—Si(R^C)_3$, $—Ge(R^C)_3$, $—P(R^P)_2$, $—N(R^N)_2$, $—OR^C$, $—SR^C$, $—NO_2$, —CN, $—CF_3$, $R^CS(O)—$, $R^CS(O)_2—$, $(R^C)_2C{=}N—$, $R^CC(O)O—$, $R^COC(O)—$, $R^CC(O)N(R)—$, $(R^C)_2NC(O)—$, and halogen;

L is $(C_1-C_{40})$hydrocarbylene or $(C_2-C_{40})$heterohydrocarbylene; and each $R^C$, $R^P$, and $R^N$ in formula (I) is independently a $(C_1-C_{30})$hydrocarbyl, $(C_1-C_{30})$heterohydrocarbyl, or —H;

wherein the ratio of moles of aluminum in the hydrocarbyl-modified methylaluminoxane to moles of metal in the metal-ligand complex is less than 500.

2. The polymerization process according to claim 1, wherein the ratio of moles of aluminum in the hydrocarbyl-modified methylaluminoxane to moles of metal in the metal-ligand complex is from greater than 20 to less than 300.

3. The polymerization process according to claim 1, wherein the hydrocarbyl-modified methylaluminoxane has less than 20 mole percent of trialkyl aluminum based on the total moles of aluminum.

4. The polymerization process according to claim 1, wherein the hydrocarbyl-modified methylaluminoxane has less than 15 mole percent of trialkyl aluminum based on the total moles of aluminum; or wherein the hydrocarbyl-modified methylaluminoxane has less than 10 mole percent of trialkyl aluminum based on the total moles of aluminum.

5. The polymerization process according to claim 1, wherein the hydrocarbyl-modified methylaluminoxane is modified methylaluminoxane.

6. The polymerization process according to claim 1, wherein at least one of $R^1$ and $R^{16}$ is a radical having formula (III).

7. The polymerization process according to claim 6, wherein $R^{42}$ and $R^{47}$ are $(C_1-C_{20})$hydrocarbyl or $—Si[(C_1-C_{20})hydrocarbyl]_3$; or wherein $R^{43}$ and $R^{46}$ are $(C_1-C_{20})$hydrocarbyl or $—Si[(C_1-C_{20})hydrocarbyl]_3$.

8. The polymerization process according to claim 1, wherein at least one of $R^1$ and $R^{16}$ is a radical having formula (II).

9. The polymerization process according to claim 8, wherein $R^{32}$ and $R^{34}$ are $(C_1-C_{12})$hydrocarbyl or $—Si[(C_1-C_{20})hydrocarbyl]_3$.

10. The polymerization process according to claim 1, wherein at least one of $R^1$ and $R^{16}$ is a radical having formula (IV) and at least two of $R^{52}$, $R^{53}$, $R^{55}$, $R^{57}$, and $R^{58}$ are $(C_1-C_{20})$hydrocarbyl or $—Si[(C_1-C_{20})hydrocarbyl]_3$.

11. The polymerization process according to claim 1, wherein $R^8$ and $R^9$ are independently selected from $(C_1-C_{20})$alkyl.

12. The polymerization process according to claim 1, wherein $R^8$ and $R^9$ are independently selected from methyl, ethyl, 1-propyl, or 2-propyl.

13. The polymerization process according to claim 1, wherein $R^3$ and R are $(C_1-C_{10})$alkyl.

14. The polymerization process according to claim 1, wherein $R^7$ and R are halogen.

15. The polymerization process according to claim 1, wherein $R^6$ and $R^{11}$ are tert-butyl.

16. The polymerization process according to claim 1, wherein L is chosen from $—CH_2(CH_2)_mCH_2—$, wherein m is 1 to 3, $—CH_2Si(R^C)(R^D)CH_2—$, $—CH_2Ge(R^C)(R^D)CH_2—$, bis(methylene)cyclohexan-1,2-diyl; $—CH_2CH(R^C)CH_2—$, $—CH_2C(R^C)_2CH_2—$, wherein each $R^C$ in L is $(C_1-C_{20})$hydrocarbyl and $R^D$ in L is $(C_1-C_{20})$hydrocarbyl.

17. The polymerization process according to claim 1, wherein M is zirconium or hafnium.

18. The polymerization process according to claim 1, wherein the olefin monomer is $(C_3-C_{20})\alpha$-olefin.

19. The polymerization process according to claim 1, wherein the olefin monomer is cyclic olefin.

20. The polymerization process according to claim 1, wherein the olefin monomer is not $(C_3-C_{20})\alpha$-olefin.

* * * * *